(12) United States Patent
Deng

(10) Patent No.: US 6,584,536 B1
(45) Date of Patent: Jun. 24, 2003

(54) BUS TRANSACTION ACCELERATOR FOR MULTI-CLOCK SYSTEMS

(75) Inventor: Brian T. Deng, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/414,693

(22) Filed: Oct. 7, 1999

(51) Int. Cl.⁷ .............................................. G06F 13/14
(52) U.S. Cl. ........................ 710/310; 710/61; 713/501
(58) Field of Search ................. 710/58–61, 305–315; 715/500–601; 713/500–601

(56) References Cited

U.S. PATENT DOCUMENTS

| | | | | |
|---|---|---|---|---|
| 5,050,066 A | * | 9/1991 | Myers et al. ................. 714/18 |
| 5,357,613 A | * | 10/1994 | Cantrell et al. .............. 710/310 |
| 5,388,225 A | * | 2/1995 | Cantrell et al. ................ 326/46 |
| 5,418,825 A | * | 5/1995 | Cantrell et al. .............. 327/113 |
| 5,560,016 A | * | 9/1996 | Fiebrich et al. ............. 710/116 |
| 5,857,005 A | * | 1/1999 | Buckenmaier ............... 326/93 |
| 5,961,628 A | * | 10/1999 | Nguyen et al. ................ 712/2 |
| 6,081,527 A | * | 6/2000 | Chappel et al. ............. 370/394 |
| 6,108,654 A | * | 8/2000 | Chan et al. .................... 707/8 |
| 6,298,049 B1 | * | 10/2001 | Vanhoof et al. ............ 370/329 |

* cited by examiner

Primary Examiner—Paul R. Myers
(74) Attorney, Agent, or Firm—Wade James Brady, III; Frederick J. Telecky, Jr.

(57) ABSTRACT

A bus transaction accelerator, incorporating an innovative control register and status register circuit. The innovative accelerator allows systems with different clocks to handshake in the background, thereby reducing bus idle time.

30 Claims, 17 Drawing Sheets

BUS TRANSACTION ACCELERATOR FOR MULTI-CLOCK SYSTEMS

BACKGROUND AND SUMMARY OF THE INVENTION

The present invention relates to bus interface circuits and methods.

BACKGROUND: DEVICE COMMUNICATIONS

Technological advances have produced devices with increasing communication bandwidth requirements. Computers, digital cameras, printers, and scanners, for example, demand high speed communications to perform properly. Images and video signals require precise synchronization of communications in order to prevent jittery graphics due to lost frames or other synchronization problems. Each device will have its own internal clock. For communications between two devices, the clocks of both devices should be synchronized. This is normally done by bus transaction handshaking. Therefore, quick bus transaction handshaking becomes a critical part in developing fast device communication schemes.

A host system (such as a personal computer) may use bus transactions to communicate with an external system (such as a printer). The host system may send control commands or data to the external system via a control register. The external system may send data, interrupt requests, or system status information to the host system via a status register. Thus the status register may be used as an interrupt register to generate an interrupt and provide an indication as to the source of the interrupt.

Delays can arise when the external system and the host system use different clocks. When writing data to a register, there is a small amount of time when the data is not stable. A register that will contain a "1" after it has stabilized may be read as a "0" during this unstable period. If the data is read during this time, the results are unpredictable. Reliable data transfer requires synchronization between the clocks so that the systems will not read unstable data. Systems that communicate with control registers and status registers must be able to exchange stable data or communications may fail.

BACKGROUND: BUS TRANSACTION HANDSHAKING

One problem associated with communication between systems with different bus clocks is when to sample an incoming signal such that it can be read correctly. In a digital system, for example, reading the contents of a register before they have stabilized will have unpredictable results: a "1" may be read as a "0" or vice-versa. Accordingly, bus transactions are designed to eliminate the possibility of reading registers when they are in an unstable state. This commonly is accomplished through a process known as "handshaking." Hand-shaking is exchange of a predetermined sequence of signals between two systems to establish synchronization between sending and receiving equipment for the purpose of exchanging data and status information.

An arrangement used to implement bus transaction handshaking is shown in FIG. 22. A host system 2200 incorporates an internal control holding register 2202 and an internal status register 2204. The host system registers are clocked by a host system clock BCLK. An external system 2208 incorporates an internal control register 2206 and an internal status holding register 2210. The external system registers are clocked by an external system clock NCLK. The host system puts control bits into control holding register 2202. After a handshaking circuit enables control register 2206, the contents of register 2202 are loaded into register 2206. The contents of register 2206 may then be placed on a bus of system 2208. Similarly, the external system 2208 may place status bits in the status holding register 2210. After a handshaking circuit enables status register 2204, the contents of register 2210 are loaded into register 2204. The contents of register 2204 may then be placed on a bus of host system 2200.

Conventional handshaking solutions provide low performance and low data throughput. A primary cause of the reduced performance and low throughput is the addition of bus cycles required to attain synchronization between the host system clock and the external system clock. Read and write transactions require synchronization between the host and the external system to meet stringent timing requirements. Additionally, synchronization of the request and response handshaking is also required between the host and external system. For example, bus cycles are lost waiting for the host bus request signal to become synchronized by the external system clock. Similarly, the response sent by the external system needs to be received under a synchronous environment with the host bus clock before the transaction may be completed. The host bus wastes bandwidth by essentially "standing by" while waiting for handshaking to become synchronized, when it could be sued to perform other transactions. When accessing status registers, there are at least two host bus clock cycles and three external system clock cycles which are wasted. With conventional handshaking each read transaction generally takes at least four host bus clock cycles+ three external clock cycles and each write transaction generally takes at least four host clock cycles+ three external clock cycles.

BACKGROUND: STATUS REGISTER ACCESS

FIG. 16 shows a prior art status register handshaking circuit. A flag__in bit from an external system enables an external system status register (flip-flop) 160. When the register is clocked by the external system NCLK, a quasi-flag__in bit is loaded into the Q output of the register 160. When handshaking circuitry enables flip-flop 162, the next rising edge of NCLK will load the Q output of flip-flop 160 into the Q output of flip-flop 162.

The handshaking circuitry incorporates a chain of flip-flops 164, 166, 168, 170, 172, and 174. The first flip-flop 164 is in a self-oscillating configuration with output Q-NOT connected to its input, D. A read request signal, rd__req, enables flip-flop 164 so that a next rising edge of host system clock BCLK will cause output Q to change states (from "1" to "0" or vice-versa). The Q output of flip-flop 164 is loaded into the Q output of flip-flop 166 at the next rising edge of NCLK. The Q output of flip-flop 166 propagates to the Q output of flip-flop 168 at the following rising edge of NCLK. At this point the Q output of flip-flop 168 will be different than the Q output of flip-flop 170 and the XNOR gate 178 will enable flip-flop 162. At the next rising edge of NCLK, the Q output of flip-flop 168 propagates to the Q output of flip-flop 170 and the flag__bit propagates to the Q output of flip-flop 162. At the following rising edge of BCLK, the Q output of flip-flop 170 propagates to the Q output of flip-flop 172. At the next rising edge of BCLK, the Q output of flip-flop 172 is propagated to the Q output of flip-flop 174. A XNOR gate 180 detects when the Q output of flip-flop 164 has propagated to the output of flip-flop 174 and places a logic "1" onto rd__response to signal the host system that flag_in has been successfully loaded into the Q output of flip-flop 162. When using this scheme, the status read operation takes 4 BCLK+3 NCLK cycles before rd_response signals the operation is done.

FIG. 17 shows a timing diagram for the prior art circuit of FIG. 16. For simplicity, BCLK and NCLK have the same frequency but are out of phase with each other. Note that the external system should not assert another flag_in until the rising edge of BCLK after rd_response is asserted. Thus status register updates are not available in increments of less than 4 BCLK+3 NCLK cycles.

BACKGROUND: CONTROL REGISTER ACCESS

FIG. 12 shows a prior art control register handshaking circuit. A Data_in bit vector is presented from the host system to a D input of an external system control register (flip-flop) 132. When the register 132 is enabled by handshaking circuitry and clocked by the external system NCLK, the Data_in vector is loaded into the Q output of the register 132.

The handshaking circuitry incorporates a chain of flip-flops 120, 122, 124, 126, 128, and 130. The first flip-flop 120 is in a self-oscillating configuration with output Q-NOT connected to its input, D. A write request signal, wr_req, enables flip-flop 120 so that a next rising edge of host system clock BCLK will cause a Q output of flip-flop 120 to change states (from "1" to "0" or vice-versa). The Q output of flip-flop 120 is loaded into the Q output of flip-flop 122 at the next rising edge of NCLK. The Q output of flip-flop 122 propagates to the Q output of flip-flop 124 at the following rising edge of NCLK. At this point the Q output of flip-flop 124 will be different than the Q output of flip-flop 126 and the XNOR gate 138 will enable flip-flop 132. At the next rising edge of NCLK, the Q output of flip-flop 124 propagates to the Q output of flip-flop 126 and the Data in bit vector propagates to the Q output of flip-flop 132. At the following rising edge of BCLK, the Q output of flip-flop 126 propagates to the Q output of flip-flop 128. At the next rising edge of BCLK, the Q output of flip-flop 128 is propagated to the Q output of flip-flop 130. A XNOR gate 134 detects when the Q output of flip-flop 120 has propagated to the output of flip-flop 130 and places a logic "1" onto wr_response to signal the host system that Data_in has been successfully loaded into the Q output of flip-flop 132. When using this scheme, the host bus must assert Data_in for at least 4 BCLK+3 NCLK while it idles, waiting for wr_response.

FIG. 13 shows a timing diagram for the prior art circuit of FIG. 12. Note that the host bus is forced to idle because it must assert Data_in until the rising edge of BCLK after wr_response is asserted.

Innovative Bus Transaction Accelerator

The present application discloses a status register architecture which solves the long bus latency problems associated when a host bus accesses status registers (e.g., an interrupt register) which are running asynchronous with the host bus clock. This architecture does not require bus idling while handshaking with another clock system. Status registers are set by the external system clock to trigger an interrupt, which is then read by the host bus interface running under the host bus clock. After the host bus interface reads the status register, automatic clear circuitry resets the status register in preparation for the next interrupt request.

The present application discloses a control register architecture which solves the long bus latency problems associated when a host bus accesses control registers which are running asynchronous with the host bus clock. This architecture does not require bus idling while handshaking with another clock system. Handshaking may be performed in the background. Control registers are set by the host system clock and read by the external bus interface running under the external bus clock. After the external bus interface reads the control register, automatic clear circuitry resets the control register timing circuit.

Advantages of the disclosed methods and structures are high performance and high data throughput.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

DEFINITIONS

Background: (operation in the) a process once set in motion continues without further supervision. For example, in a personal computer a background process is one in which the microprocessor starts the process, leaves it do something else, and returns when the process is finished to collect the results. Background processes are essential to high speed computing because microprocessor idle time is reduced.

BCLK: the bus clock of a host system.

Control register: contains a control word (control commands). For example, a personal computer that controls a peripheral device such as a printer would send its commands to the printer through the computer's control register.

Crossing the synchronization boundary: occurs when a signal moves from circuitry being clocked by an external system to circuitry being clocked by the host system and is recognized by the host system as stable data (or vice-versa).

External system: a system that uses a different clock than the host system. For example, if a personal computer is the host system, an external system may be a printer.

Handshaking: exchange of a sequence of signals between two systems to establish synchronization between sending and receiving equipment for the purpose of exchanging data and status information.

Interrupt register: contains status information. An interrupt register may contain multiple bits that are set independently. When a bit is set, it requires immediate attention from the host system. For example, a printer may send an interrupt request (bit) to a computer to notify the computer that the printer requires the computer's attention.

Multi-clock systems: systems with independent, unsynchronized clocks.

NCLK: the bus clock of an external system.

Status register: contains status information. The status register may contain multiple bits that are continuously updated to provide timely information. For example, a printer would report its present status to a personal computer by placing status information in its status register. The status register would then be read by the personal computer. An interrupt register is also an example of a status register.

Innovative Bus Transaction Accelerator

Figure 1:
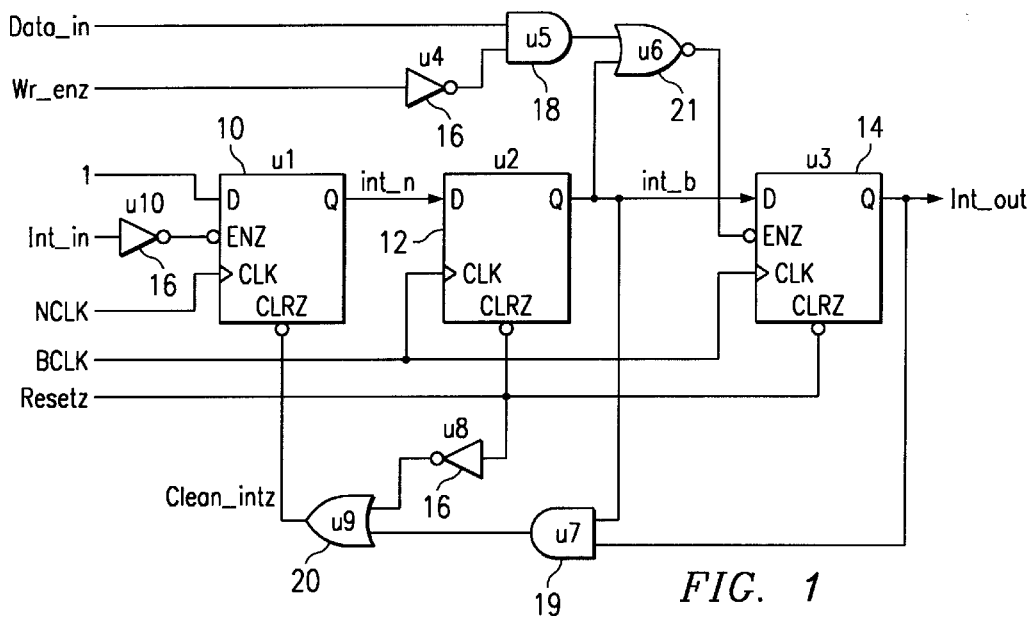
FIG. 1 shows a preferred embodiment of the innovative status register transaction accelerator circuit.
Figure 7:
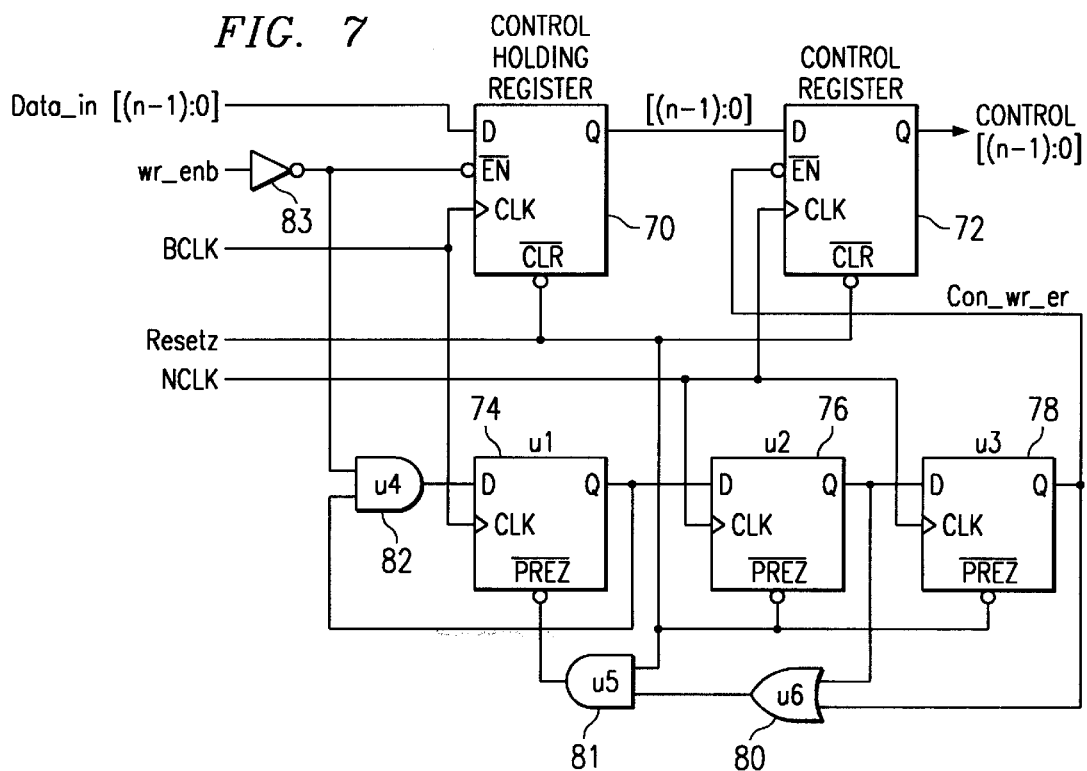
FIG. 7 shows a preferred embodiment of the innovative control register transaction accelerator circuit.

The innovative bus transaction accelerator preferably incorporates an innovative status register circuit, FIG. 1 (depicting an interrupt register), and/or an innovative control register circuit, FIG. 7.

The Innovative Status Register Circuit

In the preferred embodiment of FIG. 1, the innovative status register circuit incorporates a serial chain of flip-flops 10, 12, 14. In this particular embodiment, devices flip-flops 10 and 14 are write-enabled D-type flip-flops and flip-flop 12 is a D-type flip-flop. An interrupt request, Int__in, is input to the enable input of flip-flop 10. At the next rising edge of NCLK, a logic "1" (quasi-interrupt) is loaded into the Q output of flip-flop 10. The next rising edge of BCLK propagates the "1" to the Q output of flip-flop 12. When a control circuit enables flip-flop 14, the next rising edge of BCLK propagates the "1" to the Q output of flip-flop 14 thereby asynchronously clearing flip-flop 10 to "0" via the automatic clear circuit. At this point, the output of flip-flop 14 has synchronized with the host bus clock BCLK and may be read immediately.

Whenever the output of flip-flop 14 is set to "1", it is cleared to "0" by the host system by writing a "1" to Data__in. The Data__in signal is combined with wr__enz (active low) by an AND gate 18. The output of AND 18 is combined via a NOR gate 21 with the output of flip-flop 12. The result of the NOR operation is output to the enable input, ENZ, of flip-flop 14. At this point, the "0" at flip-flop 10 has propagated to the output of flip-flop 12 and is ready to be loaded into flip-flop 14. At the next rising edge of BCLK, flip-flop 14 will be cleared. After flip-flop 14 is cleared, it is ready for the next status bit event to occur.

In the preferred embodiment, the automatic clear circuit has a first input for accepting the Q output of flip-flop 12, a second input for accepting the Q output of flip-flop 14, and a third input for accepting a Resetz input. The first and second inputs are combined by an AND gate 19. The result of the AND operation is combined with the third input by a NOR gate 20. The automatic clear circuit outputs a clear__intz signal to the CLRZ input of flip-flop 10.

This architecture does not require host bus idling while handshaking with another clock system. Advantageously, each read transaction only takes 2 host bus clock cycles (one cycle for read request, one for read response), whereas with conventional handshaking each read transaction takes at least 4 host bus clock cycles plus 3 external system clock cycles to perform the same function. Similarly, each write transaction only takes 2 host bus clock cycles (one cycle for write request, one for write response), whereas with conventional handshaking each write transaction takes at least 4 host clock cycles plus 3 external system clock cycles to obtain the same result. Request and response handshaking are not required because the host system knows the transactions can be completed in 2 host bus clock cycles.

Figure 2:
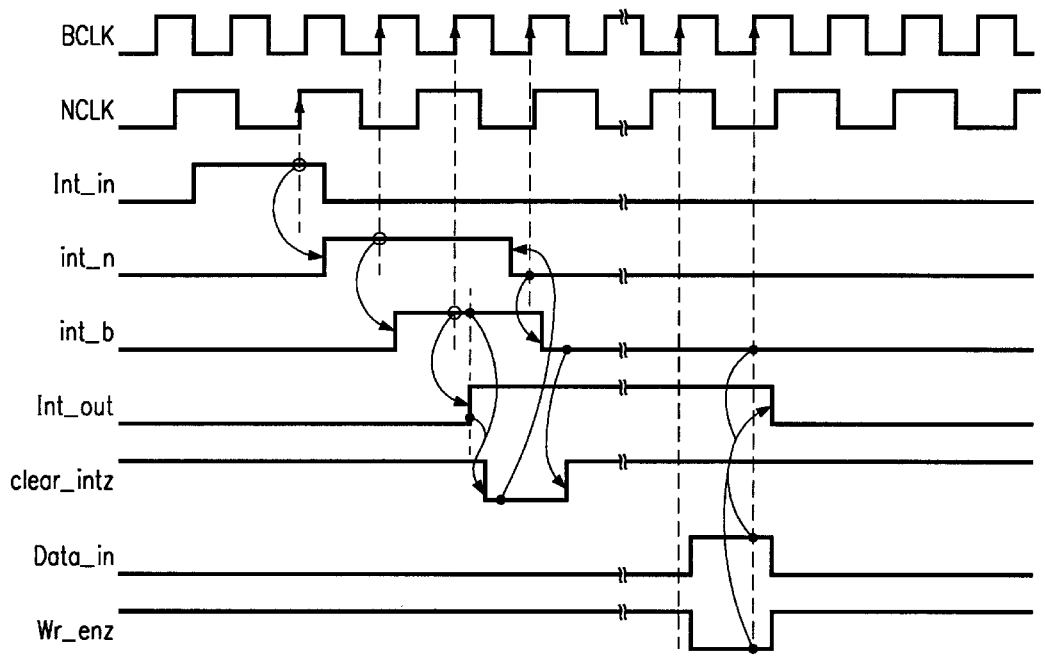
FIG. 2 shows a timing diagram for the innovative circuit of FIG. 1 where the BCLK period is less than the NCLK period.
Figure 3:
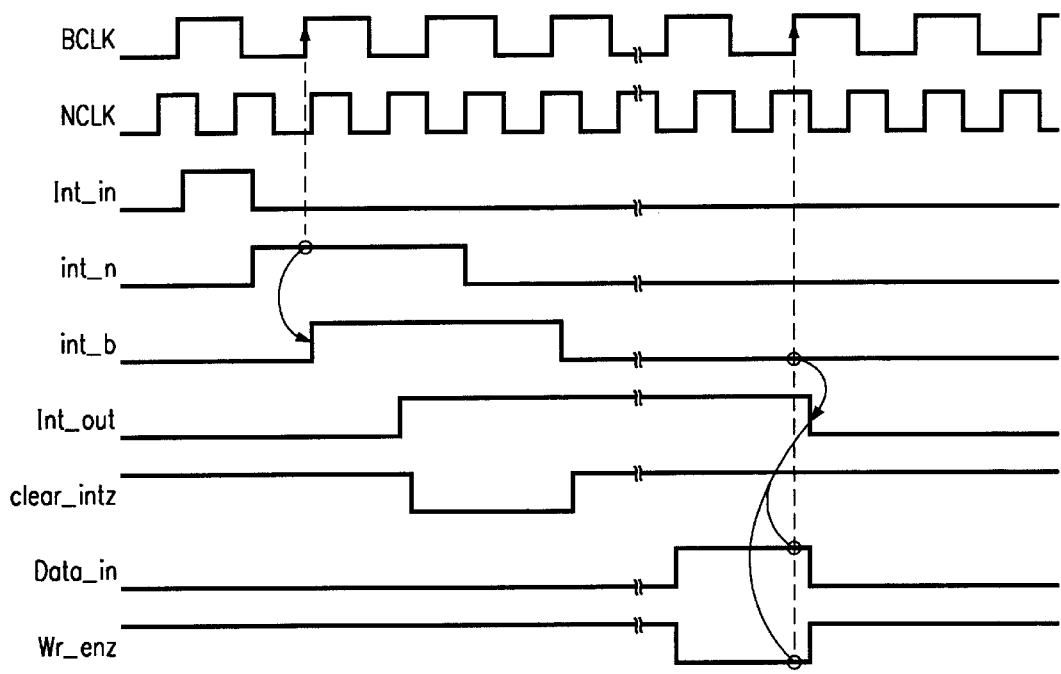
FIG. 3 shows a timing diagram for the innovative circuit of FIG. 1 where the BCLK period is greater than the NCLK period.
Figure 4:
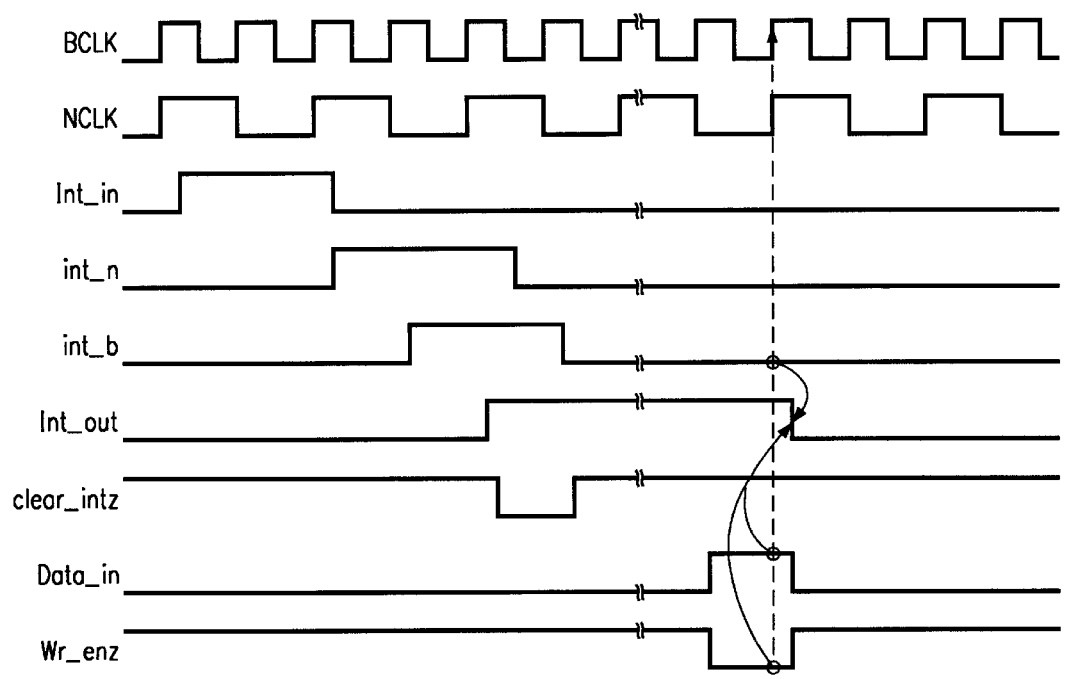
FIG. 4 shows a timing diagram for the innovative circuit of FIG. 1 where the BCLK period is approximately equal to one-half of the NCLK period.
Figure 5:
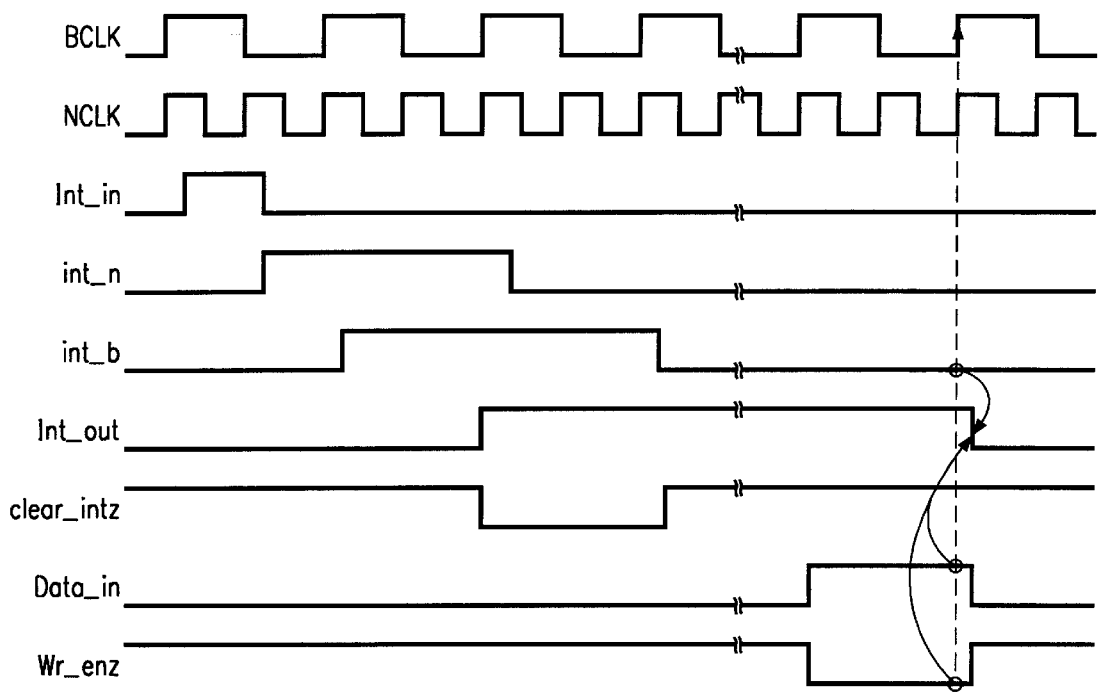
FIG. 5 shows a timing diagram for the innovative circuit of FIG. 1 where the BCLK period is approximately equal to twice that of the NCLK period.
Figure 6:
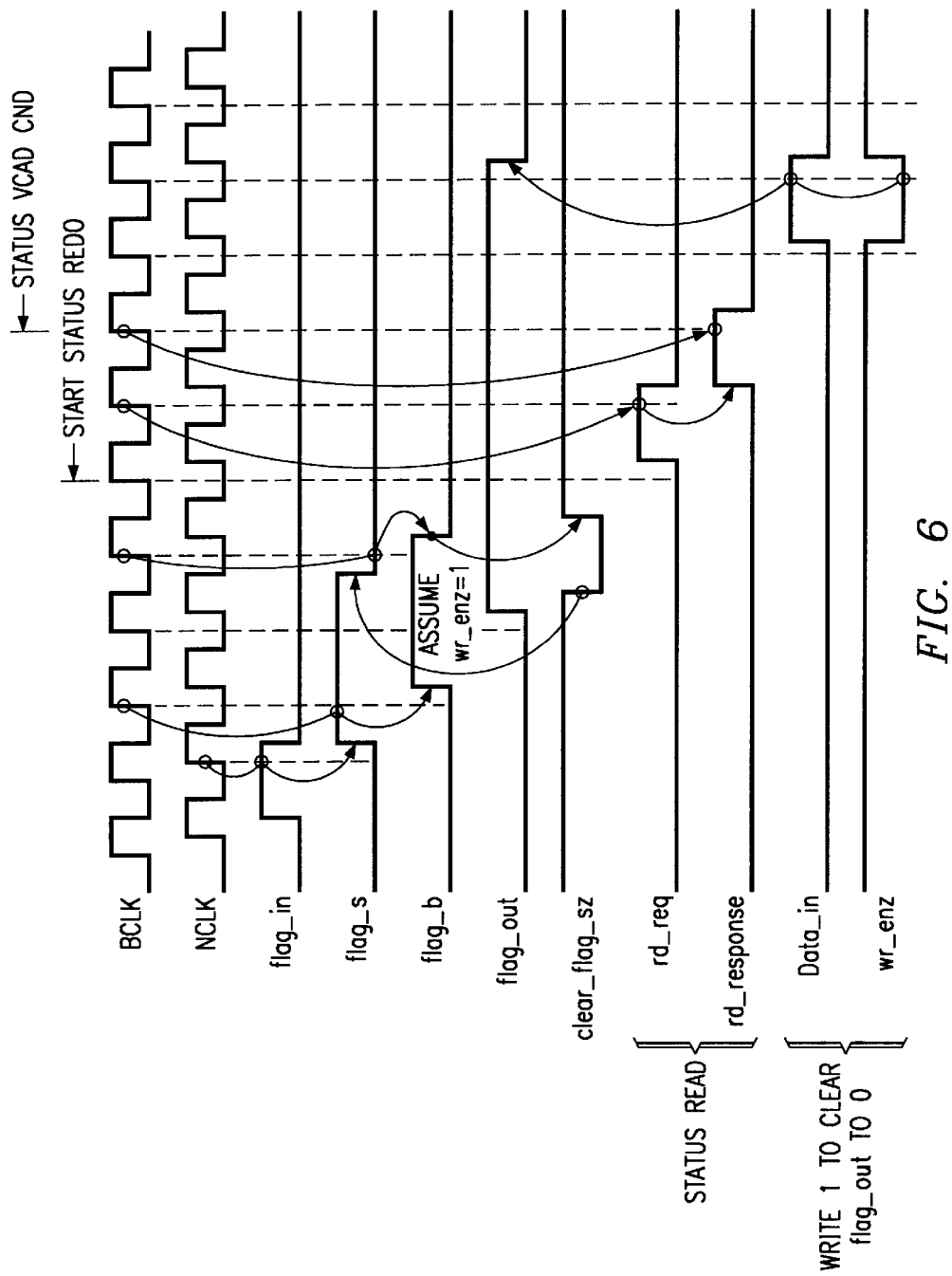
FIG. 6 shows a timing diagram for the innovative circuit of FIG. 1 where the BCLK period is equal to, but out of phase with, the NCLK period.

FIGS. 2–6 depict timing diagrams of various signals from the innovative interrupt (status) register shown in FIG. 1. Operation of the register is illustrated under several BCLK/NCLK relationships. In FIG. 2 note that the BCLK period is less than the NCLK period. In FIG. 3 note that the BCLK period is greater than the NCLK period. In FIG. 4 note that the BCLK period is one-half of the NCLK period. In FIG. 5 note that the BCLK period is twice the NCLK period. In FIG. 6 note that the BCLK period is equal to the NCLK period but the signals are out of phase with each other.

Figure 18:
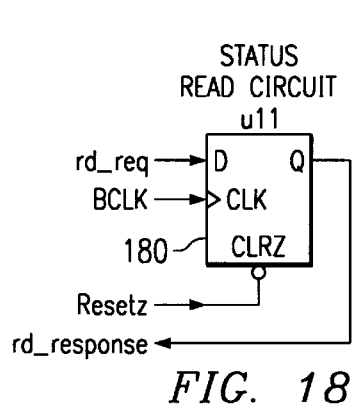
FIG. 18 shows a host system read status circuit for the innovative circuit.

FIG. 18 shows that by use of the innovative bus transaction accelerator, a rd_req (read request) signal only needs to be asserted for one host bus clock. Similarly, a rd_response (read response) signal is generated by the next host bus clock rising edge.

Figure 19:
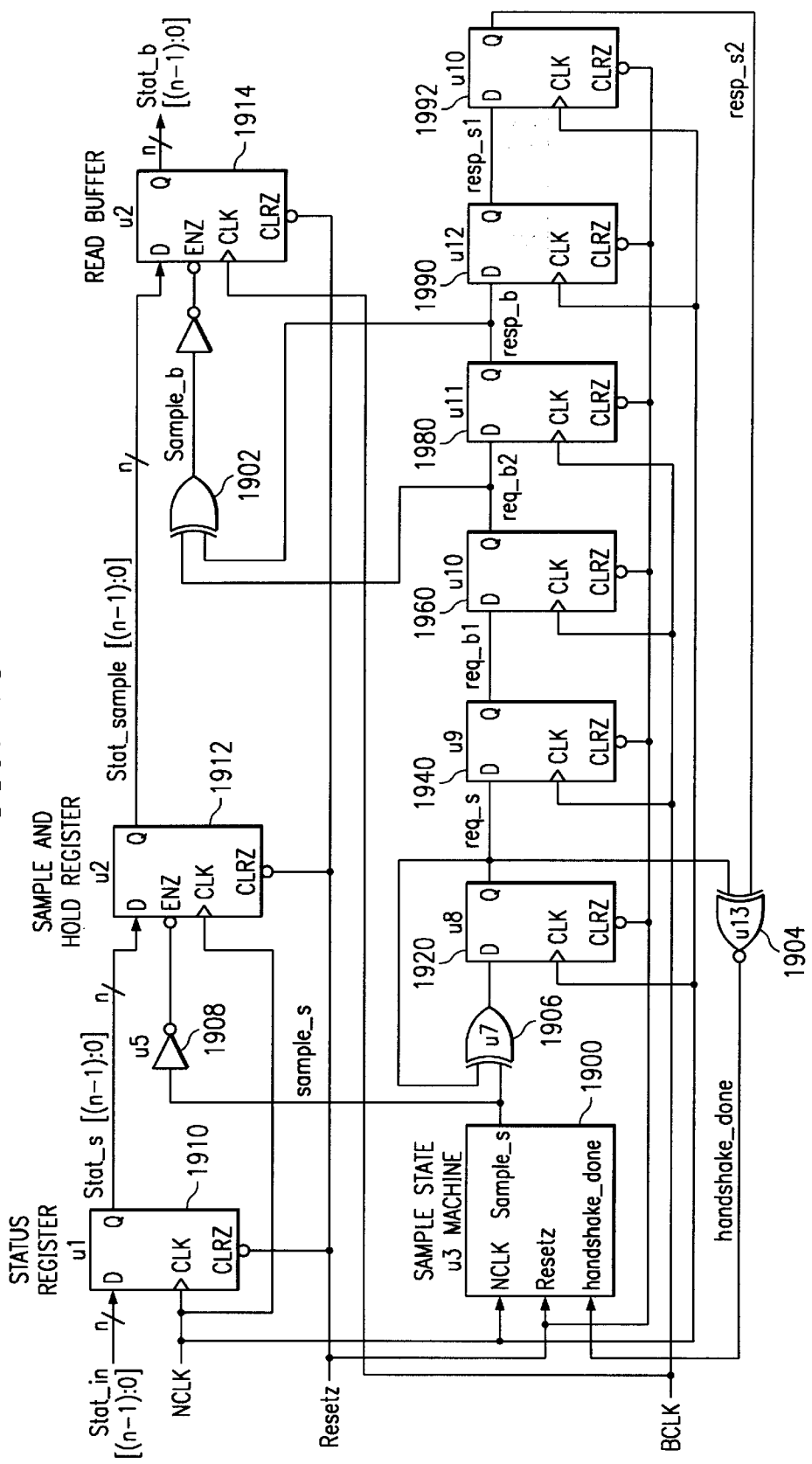
FIG. 19 shows an alternate embodiment of the innovative status register transaction circuit.

An alternate embodiment of the innovative status circuit is shown in FIG. 19. Flip-flop 1910 is an external system status register. Flip-flop 1912 is used as a sample and hold register by the external system. After being enabled by a timing circuit, flip-flop 1912 will sample the contents of flip-flop 1910 at the next rising edge of NCLK. Flip-flop 1914 is a host system read buffer. When enabled by the timing circuit, flip-flop 1914 will load the contents of the Q output of flip-flop 1912 at the next rising edge of BCLK.

A state machine 1900, support logic (gates 1904 and 1906), and flip-flops 1920, 1940, 1960, 1980, 1990, and 1992 comprise the timing circuit. An output from the state machine 1900 and a current Q output of flip-flop 1920 are XORed by gate 1906 to the input of flip-flop 1920. At the next rising edge of NCLK, the XOR 1906 result is propagated to the Q output of flip-flop 1920. At this point, the Q output of flip-flop 1920 does not contain the same value as the Q output of flip-flop 1992 and a XNOR logic gate 1904 outputs a "0" (the handshake_done signal is dragged low) to the state machine. XOR gate 1906 and flip-flop 1920 operate to output a continuous stream of either 1's or 0's until the next time the state machine 1900 outputs a "1." If a stream of 1's is being output, the next "1" from the state machine 1900 will change the output to a stream of 0's. When the stream changes from 1's to 0's (or vice-versa), flip-flop 1940 and flip-flop 1960 function as a timer that enables flip-flop 1914 after two BCLK periods. Flip-flop 1980 operates as a timer that disables flip-flop 1914 one BCLK after it is enabled. At this point the Q output of flip-flop 1914 contains external system status information synchronized to the host bus clock. Flip-flop 1990 and flip-flop 1992 function as a timer that drags the handshake_done signal high, thereby notifying the state machine that flip-flop 1912 may sample the state of flip-flop 1910 again.

Figure 20:
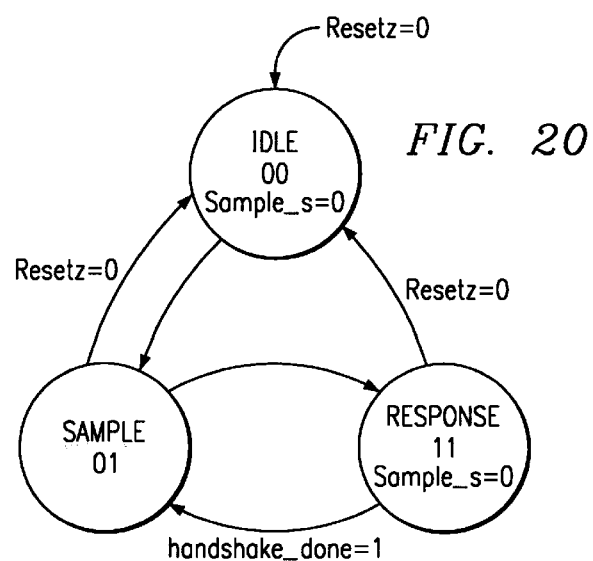
FIG. 20 shows a state diagram for the state machine of the innovative circuit of FIG. 19.

FIG. 20 shows a state machine diagram for the state machine 1900 of FIG. 19. State 00 is an idle state (and the reset state). During State 00 the state machine output is "0." At the next rising edge of NCLK the state machine will move to State 01. State 01 is a sample state. During State 01 the state machine output is "1" which enables flip-flop 1912 so that a "snapshot" of the status register 1910 may be taken. At the next rising edge of NCLK the state machine will move to State 11. State 11 is a response (wait) state. During State 11 the state machine output is "0." The state machine will stay in State 11 until the timing circuit returns a "handshake_done" signal which lets the external system know that the contents of flip-flop 1912 have reached the host system. At the next rising edge of NCLK the state machine returns to State 01 and prepares to sample flip-flop 1910 again.

Figure 21:
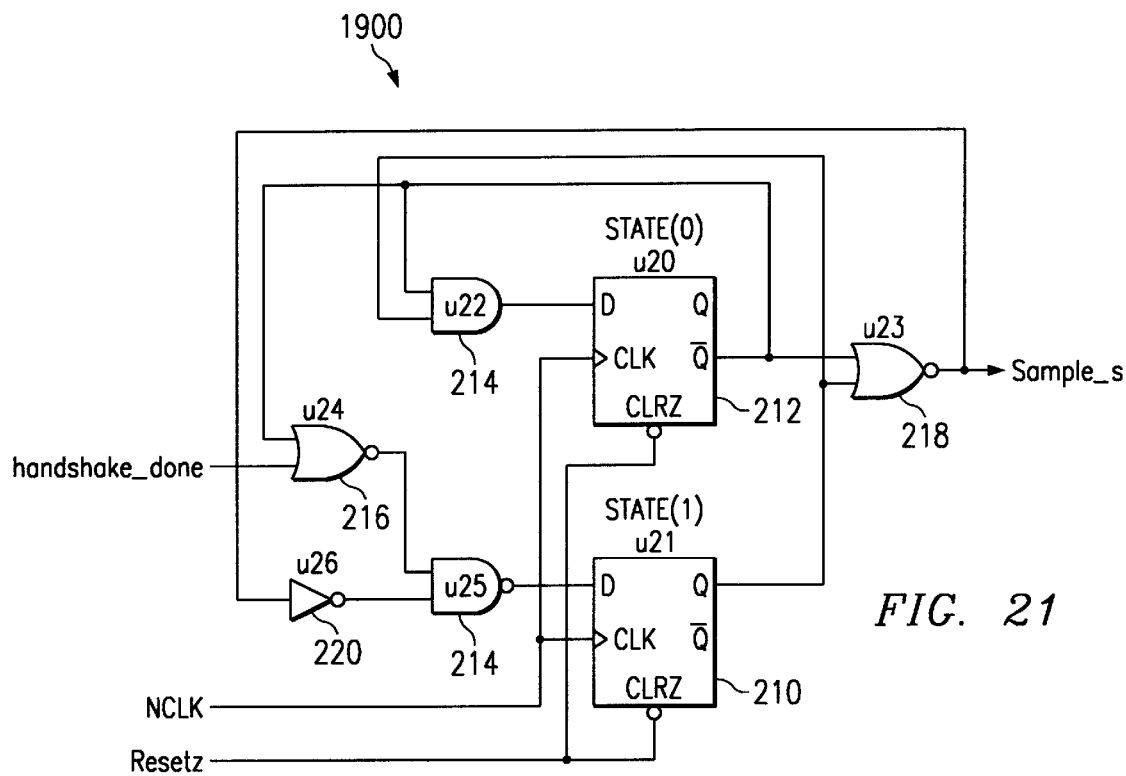
FIG. 21 shows a circuit implementing the state diagram of FIG. 20.
Figure 22:
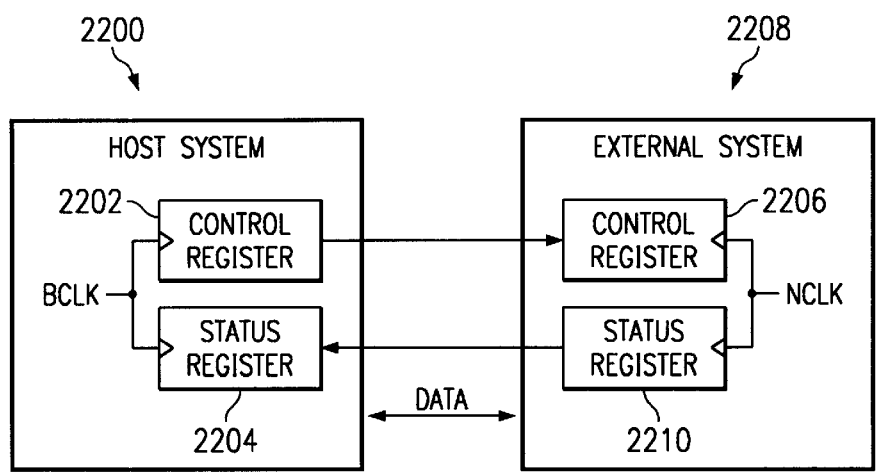
FIG. 22 shows a block diagram of a dual clock bus transaction.

FIG. 21 shows a circuit implementation of the state diagram of FIG. 20. Note that flip-flop 212 represents state variable 0 and flip-flop 210 represents state variable 1 in the state vector of form [1:0].

The following is a Verilog RTL (register transfer level) implementation for a single-bit interrupt (status) register (the status register program—int_reg.v). Verilog HDL (hardware descriptor language) is an HDL used to design and document electronic systems.

```
*/
module int_reg (Nclk, Resetz, Int_in, Bclk, Wr_enz, Data_in, Int_out)
;
    input Nclk;      // Nclk is a clock, Resetz, Int_in is synchronize
                     //    with Nclk
    input Resetz;    // Nclk domain reset, active low
    input Int_in     // Interrupt source input clocked by Nclk
    input Bclk;      // Bclk is a clock, wr_en, Data_in, Int_out are
                     // synchronized with Bclk
    input Wr_enz:    // write enable active low, write 1 to clear Int_out
    input Data_in;   // write data input, to clear Int_out Wr_enz == 1,
                     // Data_in == 1
    output Int_out;  // Interrupt output in Bclk domain
// --------------------------------------------------
// Assume Int_in only lasts for one Nclk cycle & it is active high
// --------------------------------------------------
reg int_n;      // interrupt source latch by Nclk
reg int_b1;     // int_n first sample by Bclk
reg Int_out;
wire int_clrz;  // clear int_n, active low
assign #1 int_clrz = Resetz & (~(int_b1 & Int_out)); // clear int_n,
                //active low
//--------------------------------------------------
// When int_clrz is low, clear int_n
// When Int_in is 1, latch it by Nclk
//--------------------------------------------------
always @(posedge Nclk or negedge int_clrz)
begin
    if (!int_clrz) int_n = #1 1'b0;
    else if (Int_in) int_n = #1 1'b1;
end
//--------------------------------------------------
// sample int_n by rising edge of Bclk, then at the next
// rising edge of Bclk, it will determine whether to set
// Int_out high or not
//--------------------------------------------------
always @(posedge Bclk or negedge Resetz)
begin
    if (!Resetz) int_b1 = #1 1'b0;
    else int_b1 = #1 int_n;
end
//--------------------------------------------------
// At rising edge of Bclk if int_b1 is high, set Int-out to 1
// to clear Int_out, write 1 to this flip-flop
// wr_enz == 1, Data_in == 1, after rising edge of Bclk,
// Int_out = 0.
//--------------------------------------------------
always @(posedge Bclk or negedge Resetz)
begin
    if (Resetz) Int_out = #1 1'b0;
    else if (int_b1) Int_out = #1 1'b1;  // if Int_b1 is high, set
                                         // Int_out to 1
    else if (!Wr_enz & Data_in) Int_out = #1 1'b0;  // write 1 to clear
end
endmodule
```

The Innovative Control Register Circuit

The innovative control register circuit, in the preferred embodiment of FIG. 7, incorporates serially connected flip-flops 70 and 72 and a timing circuit with automatic clear. In the embodiment shown, flip-flops 70 and 72 are write-enabled D-type flip-flops. Flip-flops 74, 76, and 78 are D-type flip-flops. A host system asserts a write enable signal, wr_enb. At the next rising edge of the host system clock BCLK, databits, from vector DataIn, are loaded into the Q output of flip-flop 70. After the timing circuit enables flip-flop 72, the next rising edge of the external system clock, NCLK, loads the output of flip-flop 70 to the Q output of flip-flop 72.

The timing circuit incorporates a chain of serially connected flip-flops 74, 76, 78. Inverted wr_enb and the Q output of flip-flop 74 are combined in AND gate 82. When wr_enb enables flip-flop 70, the result the AND gate 82 will output a "0". At the rising edge of the next BCLK, the "0" is propagated to the Q output of flip-flop 74. At the rising edge of the next NCLK, the "0" is propagated to the output of flip-flop 76. On the following rising edge of NCLK, the "0" is propagated to the output of flip-flop 78 and the enable input of flip-flop 72. When the output of flip-flops 76 and 78 are "0", the clear circuit presets the Q output of flip-flop 74 to "1". After the next two NCLK cycles, the "1" has propagated to the output of flip-flop 78 and the circuit is ready to pass other control bits to the external system.

Figure 8:
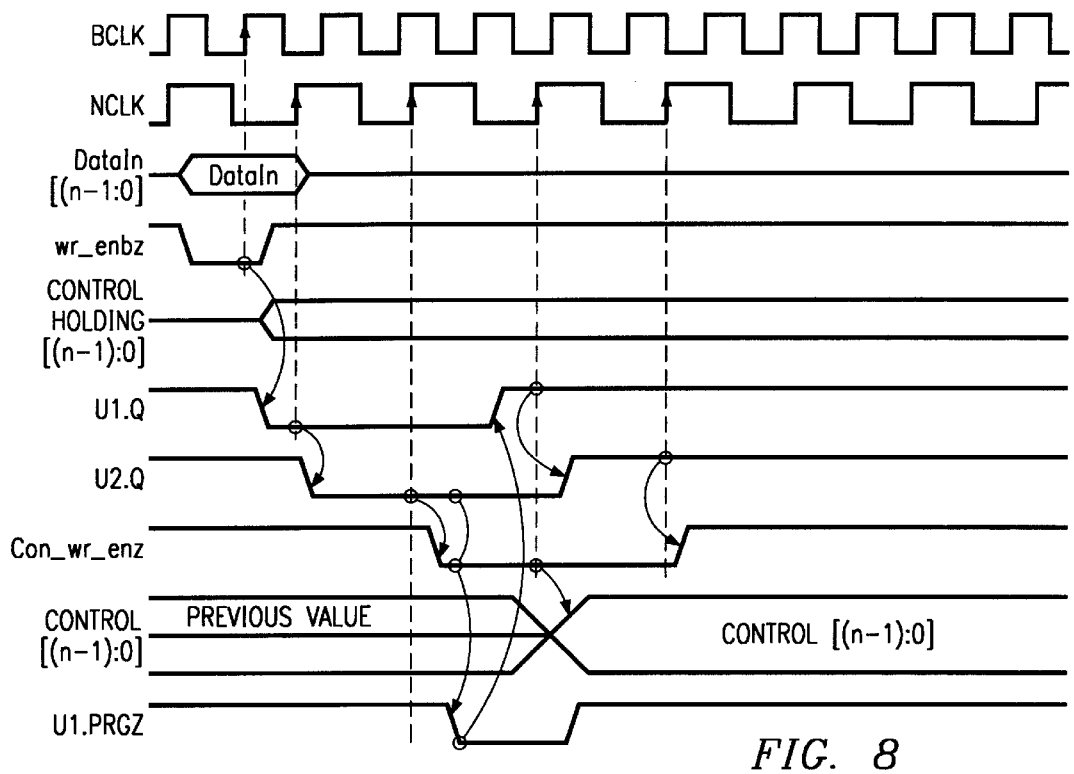
FIG. 8 shows a timing diagram for the innovative circuit of FIG. 7 where the BCLK period is less than the NCLK period.
Figure 9:
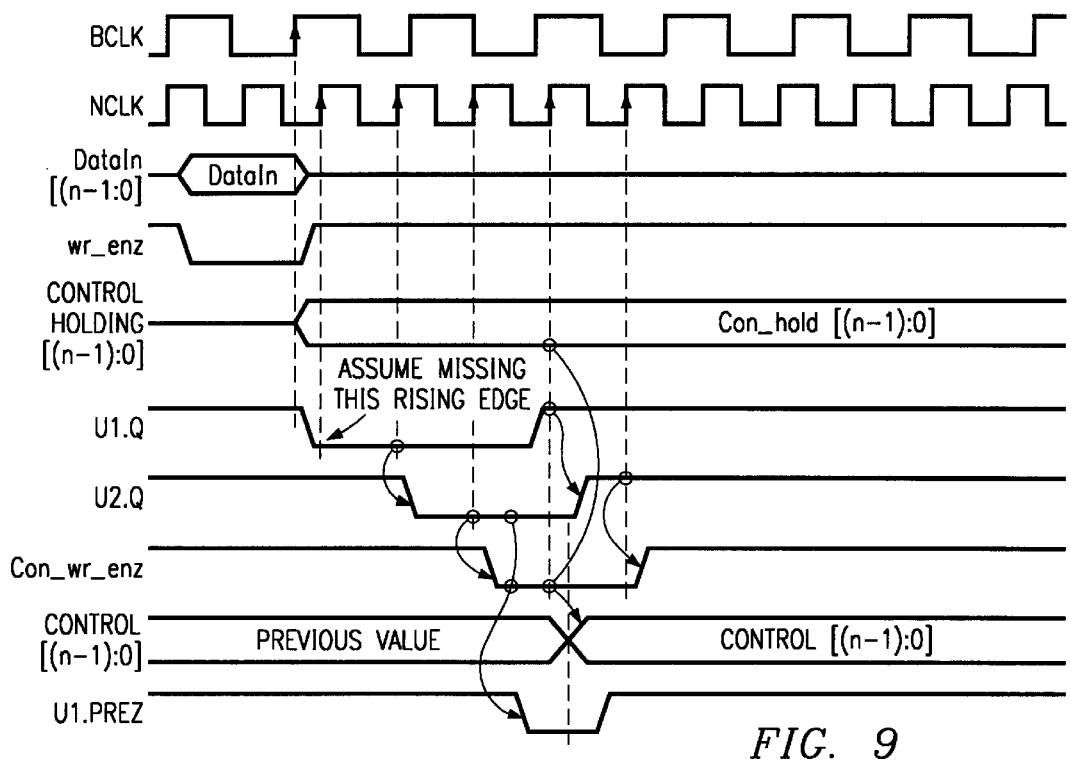
FIG. 9 shows a timing diagram for the innovative circuit of FIG. 7 where the BCLK period is greater than the NCLK period.
Figure 10:
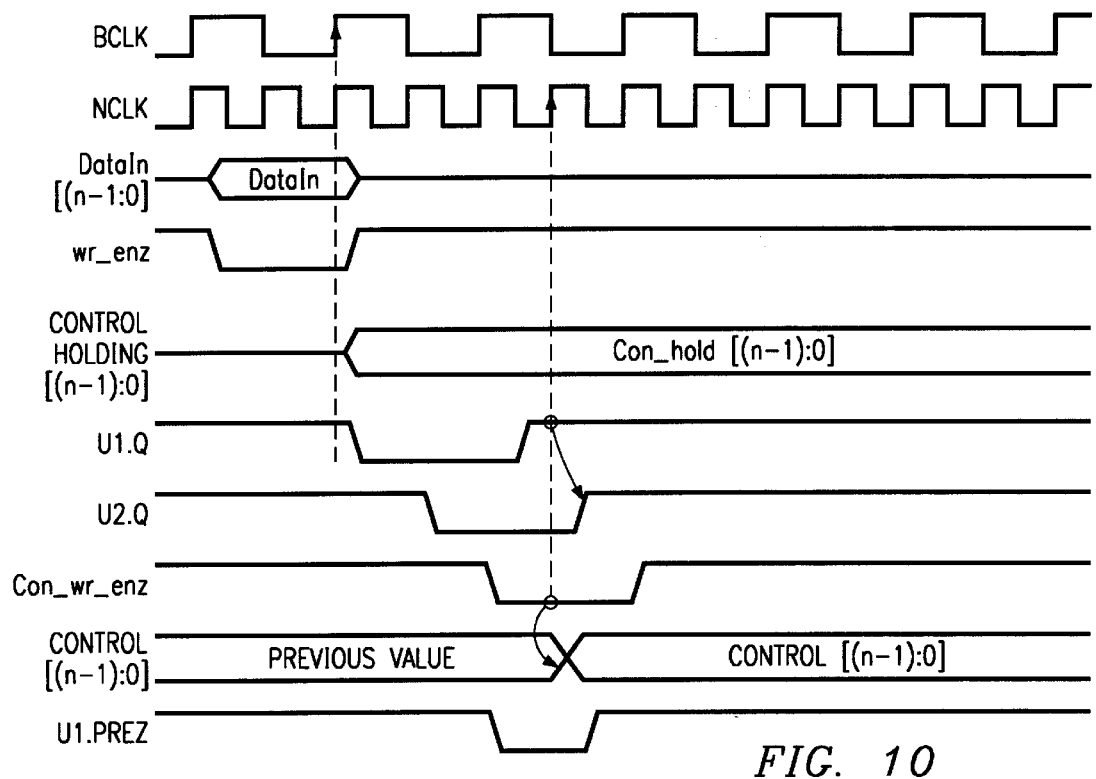
FIG. 10 shows a timing diagram for the innovative circuit of FIG. 7 where the BCLK period is approximately equal to one-half of the NCLK period.
Figure 11:
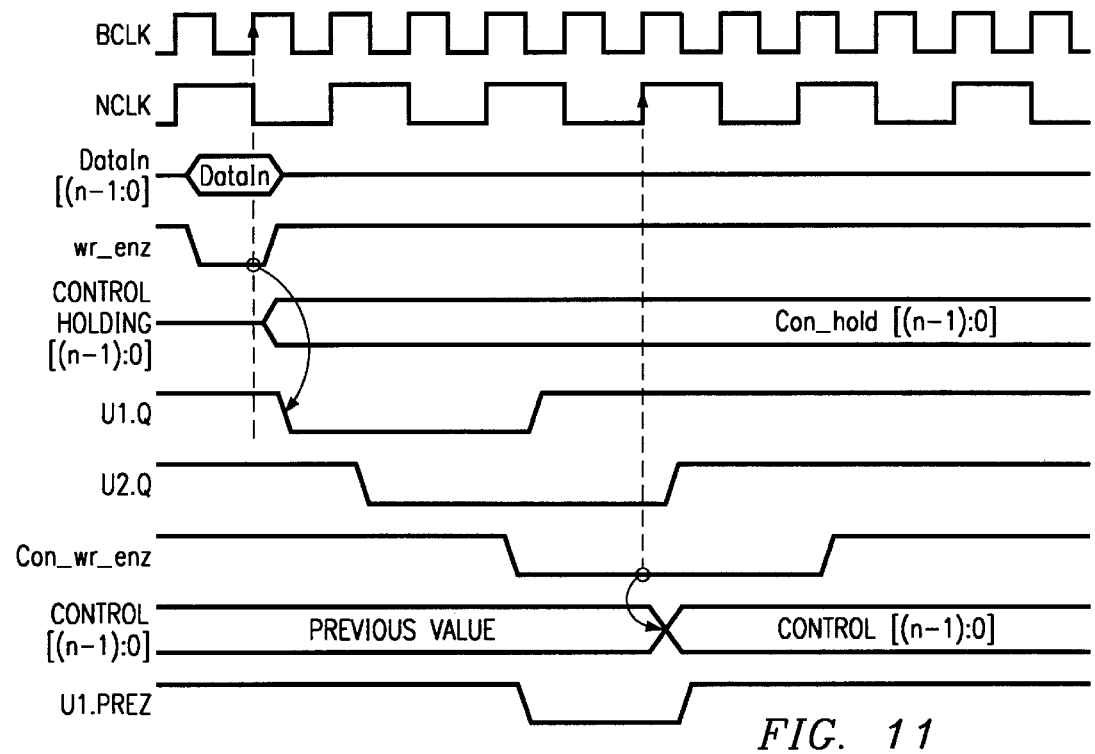
FIG. 11 shows a timing diagram for the innovative circuit of FIG. 7 where the BCLK period is approximately equal to twice that of the NCLK period.
Figure 12:
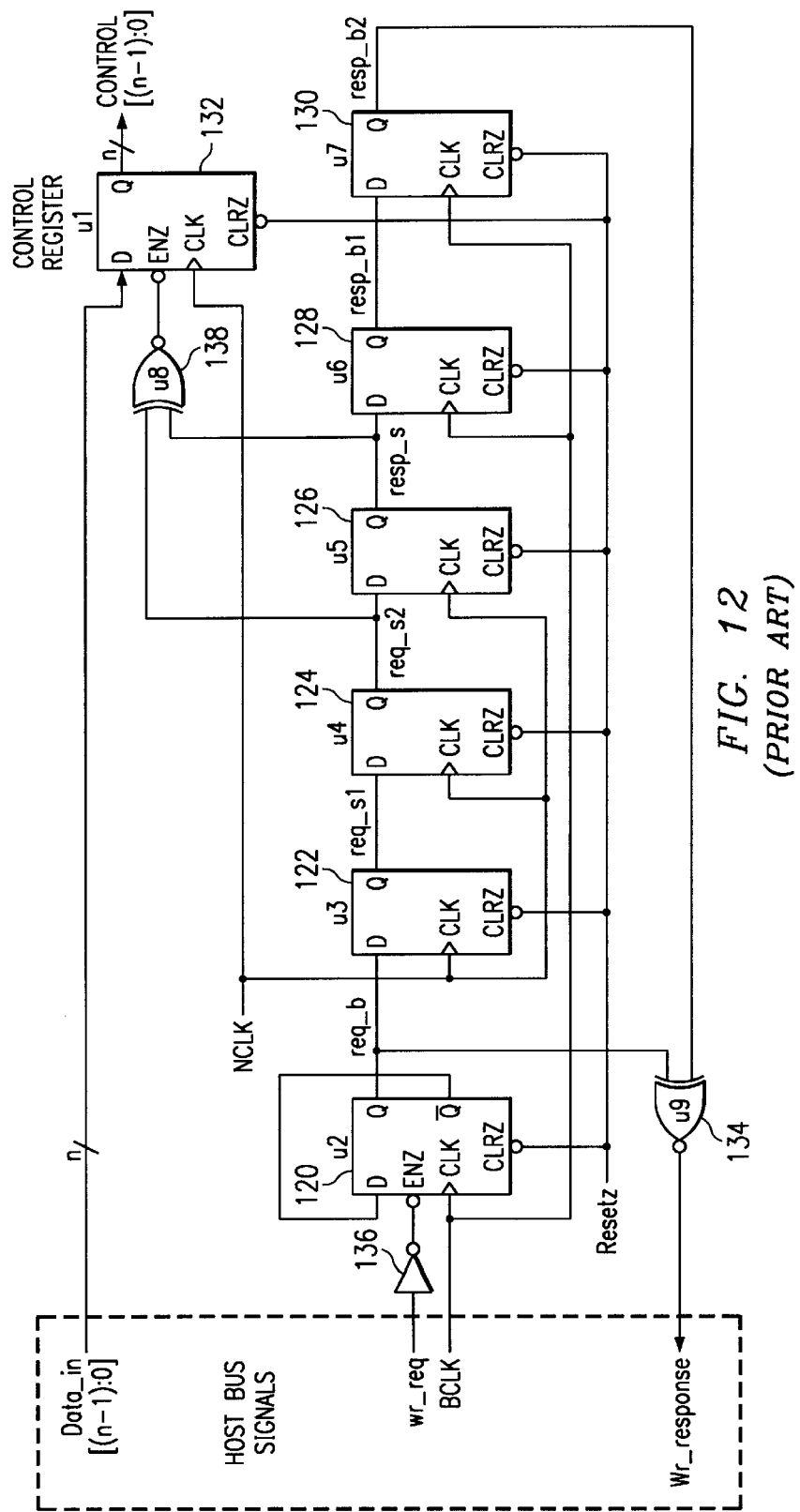
FIG. 12 shows a prior art embodiment of a control register transaction circuit.
Figure 13:
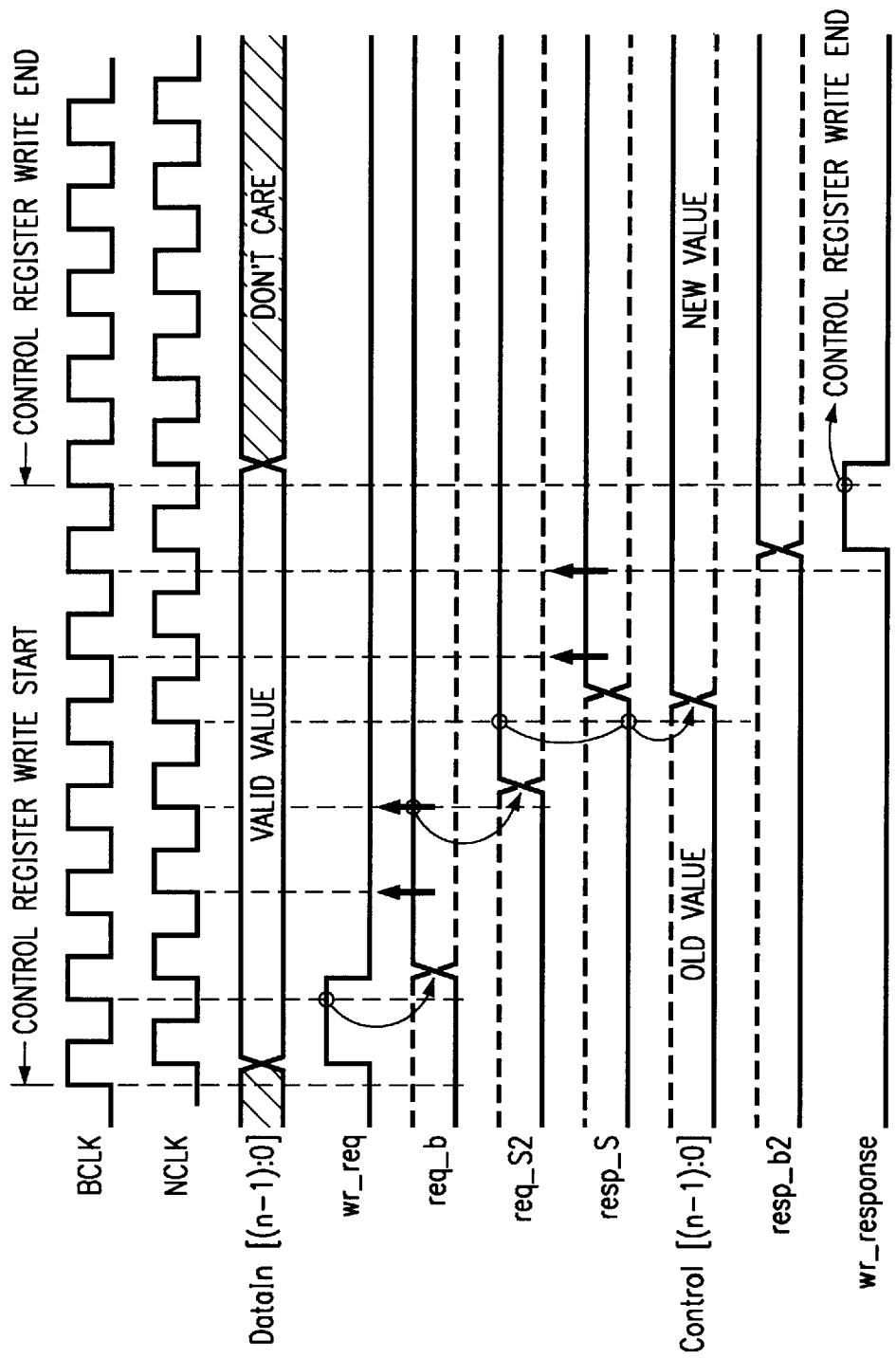
FIG. 13 shows a timing diagram for the circuit of FIG. 12.

FIGS. 8–11 depict timing diagrams of various signals from the innovative control register shown in FIG. 7. Operation of the register is illustrated under several BCLK/NCLK relations. In FIG. 8 note that the BCLK period is less than the NCLK period. In FIG. 9 note that the BCLK period is greater than the NCLK period. In FIG. 10 note that the BCLK period is twice the NCLK period. In FIG. 11 note that the BCLK period is one-half of the NCLK period.

Figure 14:
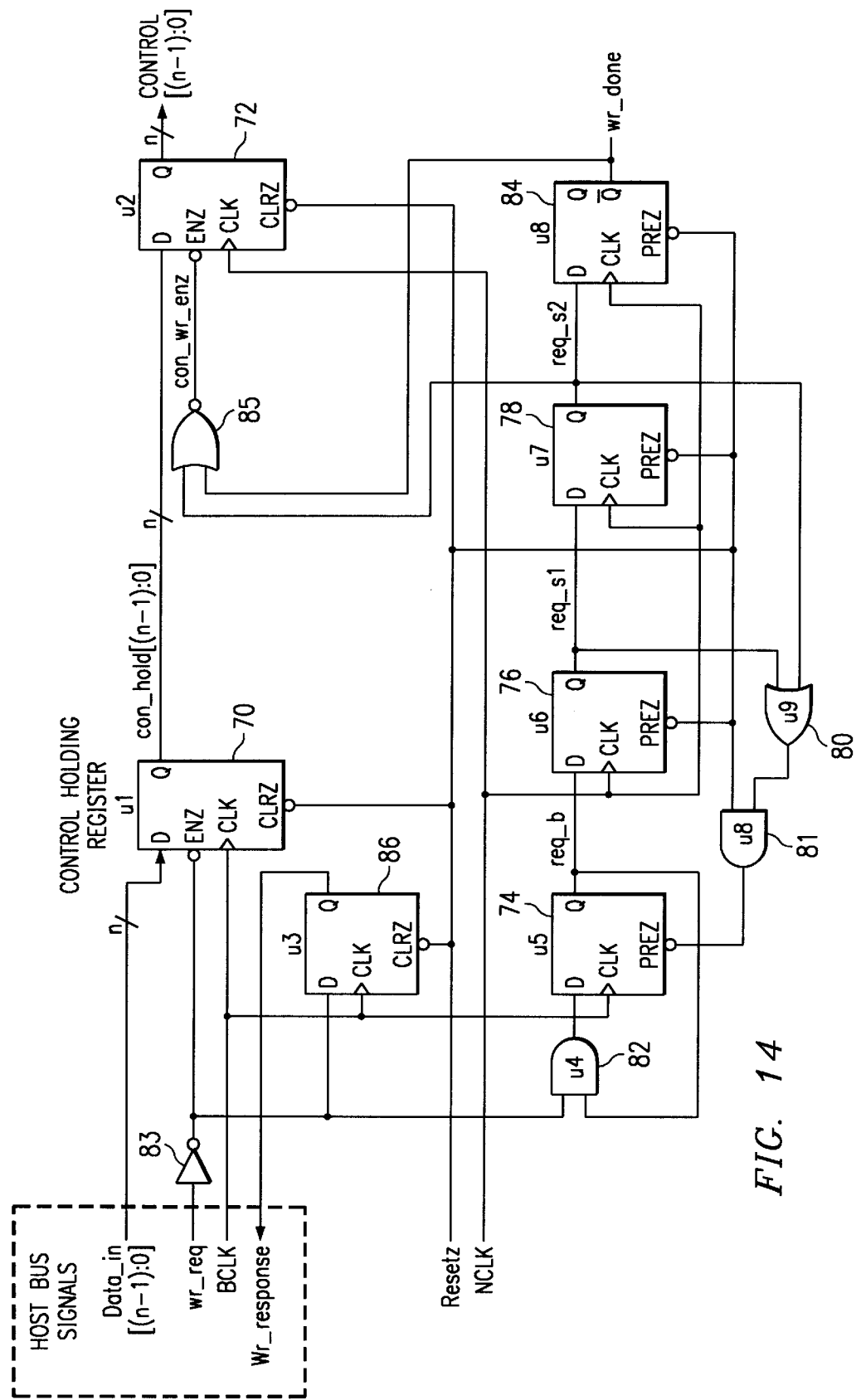
FIG. 14 shows an alternate embodiment of the innovative control register transaction circuit.

An alternate embodiment of the innovative control circuit is shown in FIG. 14. This embodiment operates essentially the same as the embodiment shown in FIG. 7. One difference is that an additional flip-flop 84 has been added to the chain. The purpose of adding flip-flop 84 is to only write enable flip-flop 72 once. Without flip-flop 84, flip-flop 72 would be enabled twice (thus loading twice). By ORing 85 the QNOT output of flip-flop 84 with the output of flip-flop 78, flip-flop 72 is only enabled once.

Figure 15:
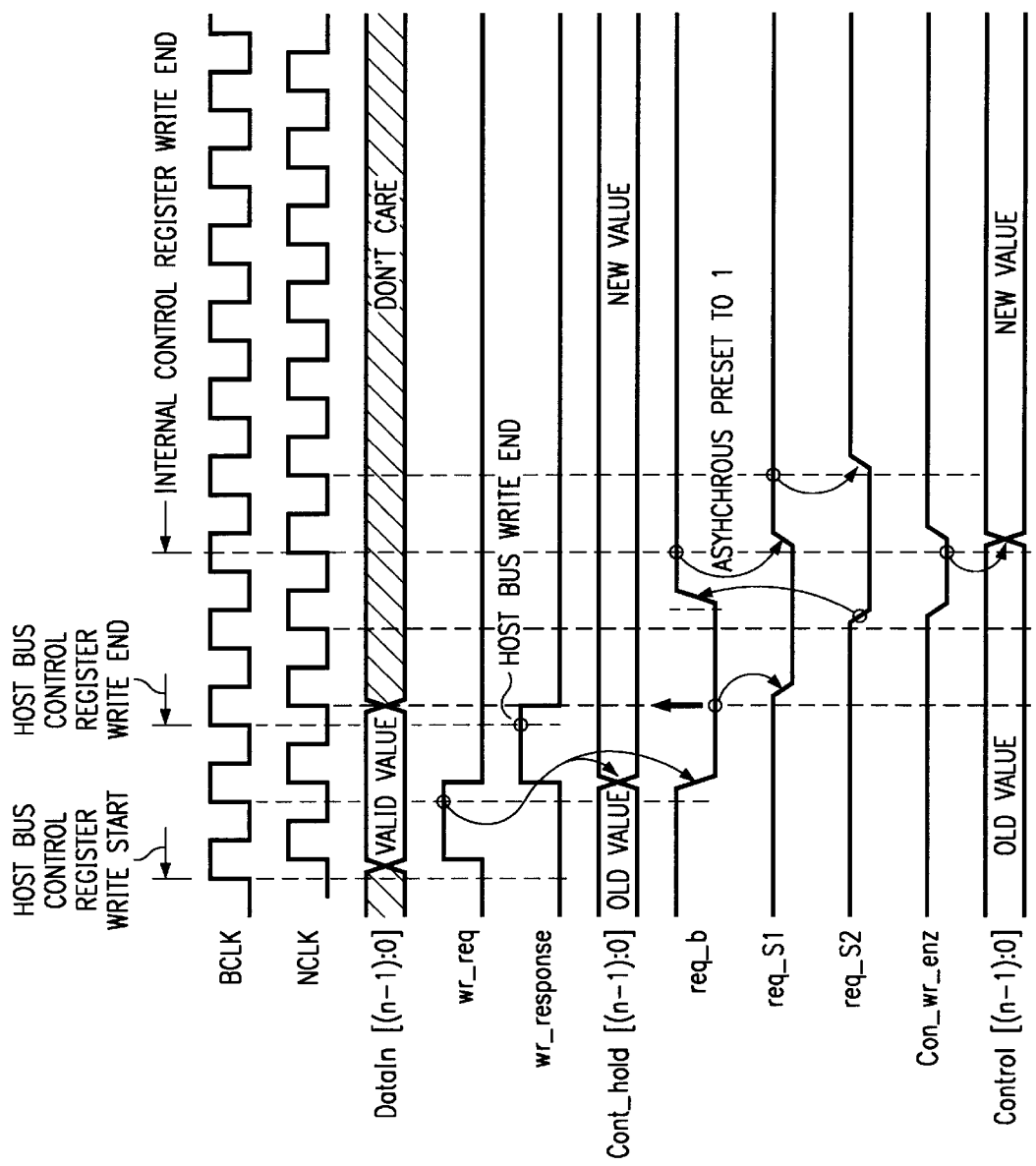
FIG. 15 shows a timing diagram for the innovative circuit of FIG. 14.
Figure 16:
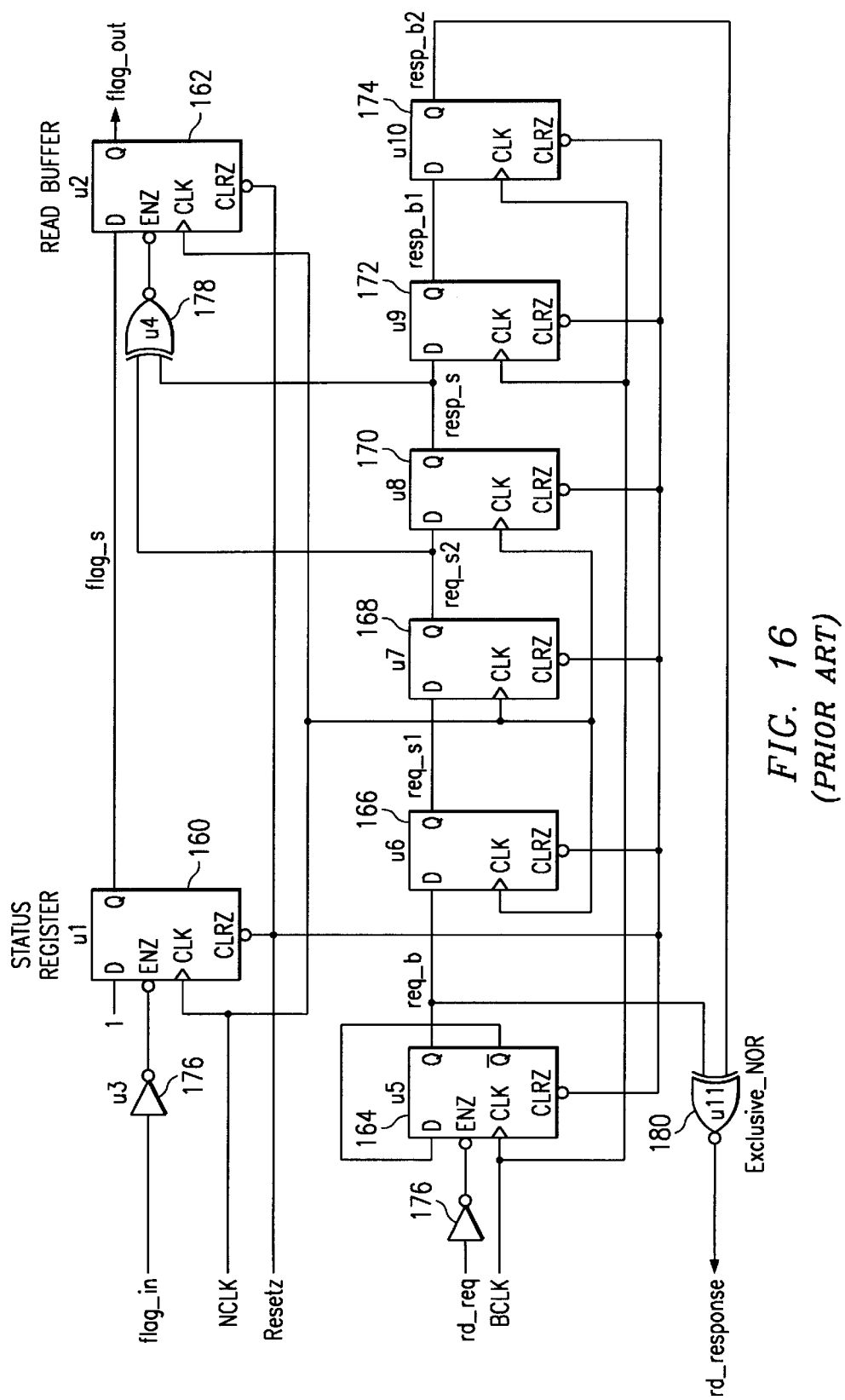
FIG. 16 shows a prior art embodiment of a status register transaction circuit.
Figure 17:
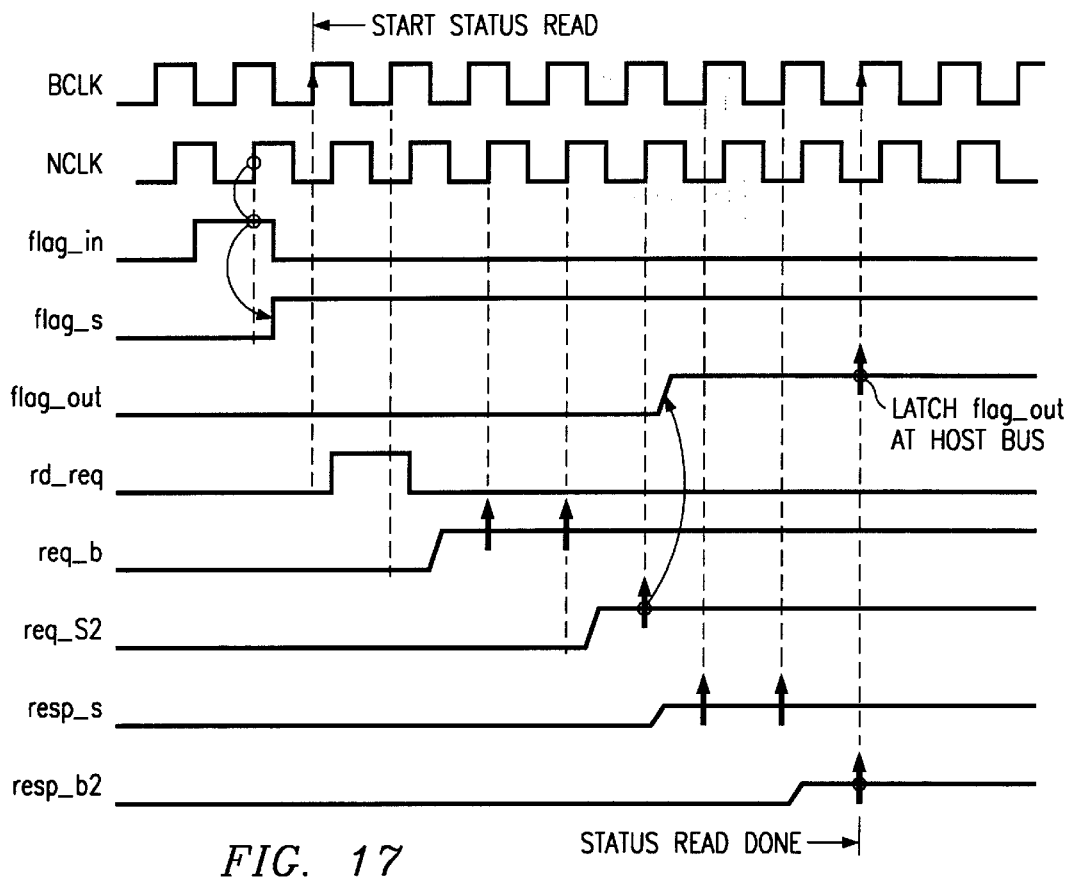
FIG. 17 shows a timing diagram for the circuit of FIG. 16.

FIG. 15 depicts timing diagrams of various signals from the embodiment of FIG. 14. Note that the con_wr_enz signal is only held low for one NCLK period whereas con_wr_enz is held low for two NCLK periods in FIGS. 8–11.

The following is a Verilog RTL (register transfer level) implementation for a single-bit control register (the control register program—control$_{13}$reg.v). Verilog HDL (hardware descriptor language) is an HDL used to design and document electronic systems.

```
*/
module control_reg (Bclk, Resetz, Wr_en_bz, Data_in_b, Nclk,
Data_out_n) ;
      input Bclk;      // Bclk is a clock, Resetz, Wr_en_bz, Data_in_b, are
                       // synchronized with Bclk
      input Resetz;    // Bclk domain reset, active low
      input Wr_en_bz;  // write enable active low, load Data_in_b by
                       // Bclk.
      input Data_in_b; // write data input synchronize with Bclk
      input Nclk;      // Nclk is a clock, Data_out_n are synchronized with
                       // Nclk.
      output Data_out_n;  // Data out to Nclk domain
// --------------------------------------------------------
// Assume Data_in_b only lasts for one Bclk cycle
// Wr_en_bz lasts for one Bclk cycle, active low
// --------------------------------------------------------
reg data_in_b1;        // last data input from Bclk domain
reg Data_out_n;        // data output to Nclk domain
reg Wr_en_bz;          // write enable, active low
reg Wr_en_blz;
reg Wr_en_nlz, wr_en_nz;   // Nclk write enable, active low
wire wr_en_disz;       // disable write enable
assign #1 wr_en_disz = Resetz & (wr_en_nlz | wr_en_nz));
// --------------------------------------------------------
// load data input by Bclk
// --------------------------------------------------------
always @(posedge Bclk or negedge Resetz)
begin
      if (!Resetz) data_in_b1 = #1 1'b0;     //clear control register value
      else if (!Wr_en_bz) data_in_b1 = #1 data_in_b;  //write enable
                                             // active, load input data.
end
// --------------------------------------------------------
// Update control register to Nclk domain
// --------------------------------------------------------
always @(posedge Nclk or negedge Resetz)
begin
      if (!Resetz) Data_out_n = #1 1'b0;     //clear control register value
      else if (!Wr_en_nz) Data_out_n = #1 data_in_b1;  //write enable
                                             // active, load input data.
end
// --------------------------------------------------------
// Synchronize write enable signal from Bclk domain to Nclk domain
// write enable signal is active low
// --------------------------------------------------------
always @(posedge Bclk or negedge wr_en_disz)
begin
      if (!wr_en_disz) wr_en_blz = #1 1'b1;
      else if (!Wr_en_bz) wr_en_blz = #1 1'b0;   //latch input write enable
                                             // signal, which lasts 1 Bclk cycle
end
always @(posedge Nclk or negedge Resetz)
begin
      if (!Resetz) wr_en_nlz = #1 1'b1;
      else wr_en_nlz = #1 wr_en_blz;
```

-continued

```
end
always @(posedge Nclk or negedge Resetz)
begin
    if (!Resetz) wr_en_nz = #1 1'b1;
    else wr_en_nz = #1 wr_en_nlz;
end
endmodule
```

GP2Lynx—TSB12LV32

Figure 23:
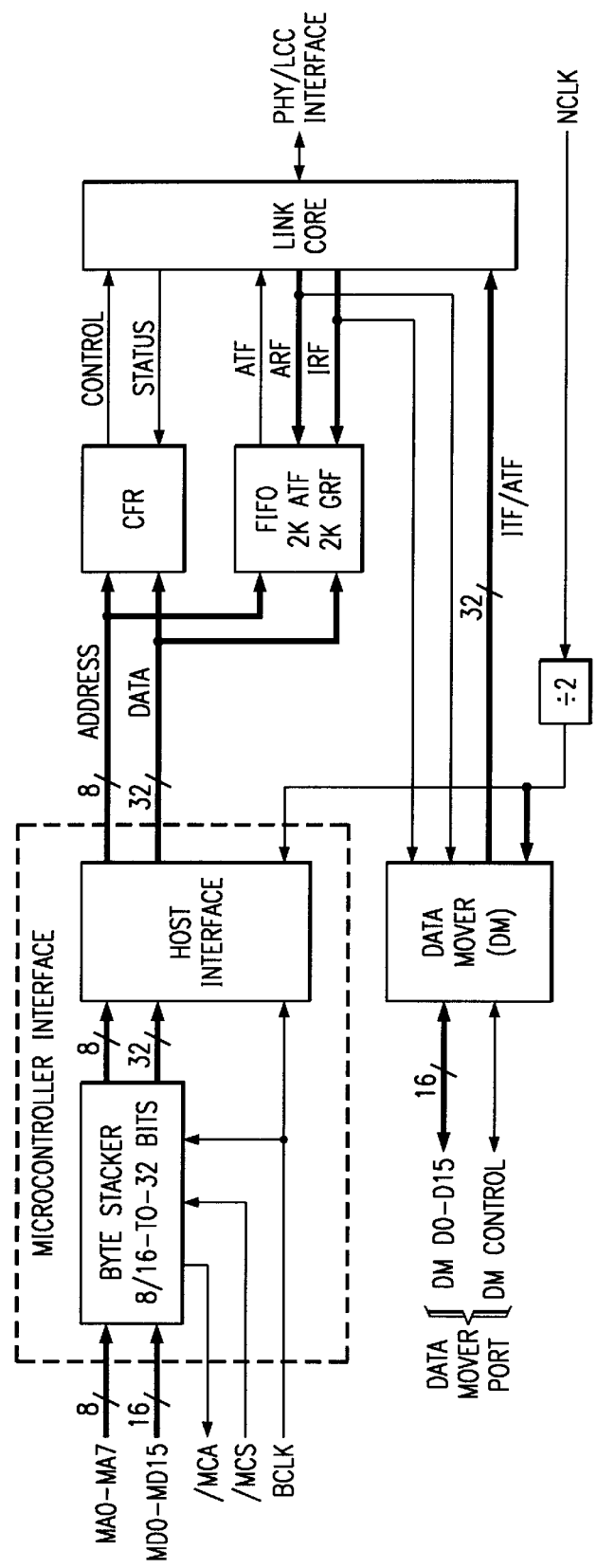
FIG. 23 shows a functional block diagram of a product implementation—the TSB12LV32 ("GP2Lynx") 1394 serial bus device.

FIG. 23 shows a functional block diagram of the presently preferred product implementation—the TSB12LV32 ("GP2Lynx"). The GP2Lynx (short for "general purpose link") is a high-performance general-purpose IEEE 1394. A Link-Layer Controller ("LLC"). The GP2Lynx is optimized for use as a peripheral LLC and provides 1394 connectivity for peripherals, with a minimum of support circuitry. The device performs bidirectional asynchronous and isochronous ("ISO") data transfers to and from an IEEE 1394-1995 serial bus physical layer ("PHY") device. The device has the capability of transferring data between a host controller, the 1394 PHY-LINK interface, and external devices connected to the local bus interface. The 1394 PHY-LINK interface provides the connection to the 1394 physical layer device and is supported by the LLC. The LLC provides the control for transmitting and receiving 1394 packet data between the microcontroller interface and the PHY-LINK interface, via two internal 2 K byte FIFOs at rates up to 400 Mbit/s. The GP2Lynx transmits and receives correctly formatted 1394 packets, generates and detects the start of ISO packets, communicates transaction layer transmit requests to the PHY, and generates and inspects the 32-bit cyclic redundancy check ("CRC").

The GP2Lynx has a programmable 8/16-bit data bus which interfaces to the selected microcontroller. Also, single-channel data mover ("DM") support is provided for unbuffered ISO transmission to unbuffered 16-bit ISO ports. The ISO transmit DM reads digital data from the IsoPort (D0–D15) and passes it to the 1394 ISO transmit interface.

All microcontroller read/writes are initiated by the microcontroller. The byte stacker/host interface allows the GP2Lynx to be easily connected to most host processors. The byte stacker consists of a programmable 8/16- bit data bus and an 8-bit address bus. The GP2Lynx uses cycle-start and cycle-acknowledge handshake signals to allow the local bus clock and the 1394 clock to be asynchronous to one another.

In FIG. 23, BCLK is the microcontroller clock. MA0–MA7 are the microcontroller address bus lines. MD0–MD15 are the microcontroller data bus lines. MCS is the microcontroller cycle start. When asserted low, MCS signals the microcontroller cycle start. MCA is the microcontroller acknowledge. When MCA is asserted low, MCA signals an acknowledge of the microcontroller from the GP2Lynx. NCLK is the system clock.

Asynchronous transmit (host bus to GP2Lynx) refers to the use of two 2 K byte asynchronous-transmit FIFOs ("ATF"). Two 2 K byte general-receive FIFOs ("GRF") are shared by received asynchronous data and isochronous data. The FIFO handles both asynchronous-transmits (ATF) and receives (ARF), and isochronous receives (IRF). The isochronous transmits (host bus to GP2Lynx) are directly from the DM to the Link Core. The transmitter sends any packets available at the ISO-transmit interface immediately following reception or transmission of the cycle-start message. CFR is the configuration register.

Further details of the preferred product implementation may be found in the GP2Lynx datasheets, available from Texas Instruments, Inc., which are hereby incorporated by reference. Of course, while the GP2Lynx represents the presently preferred product implementation, the innovative techniques described herein and claimed below may be used in any number of different devices.

Figure 24:
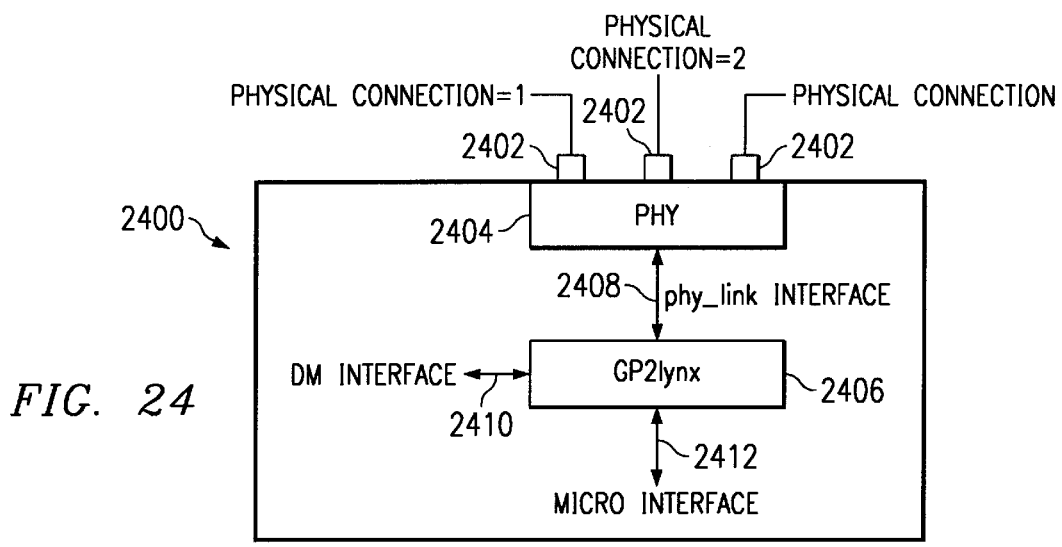
FIG. 24 shows a block diagram of the preferred embodiment in a serial bus device.

FIG. 24 shows a block diagram of the preferred embodiment in a serial bus device. The serial device 2400 in this particular embodiment, conforms to the IEEE 1394-1995 specification. The serial device 2700 shows three physical connection ports 2402 for interfacing to other compatible serial bus devices. The GP2Lynx 2406 communicates with the physical layer interface controller 2404 over the PHY-LINK interface 2408. Interfacing to the GP2Lynx on-board data mover is provided by the DM interface 2410. Interfacing to the microcontroller interface is provided over the micro-interface 2412.

Figure 25:
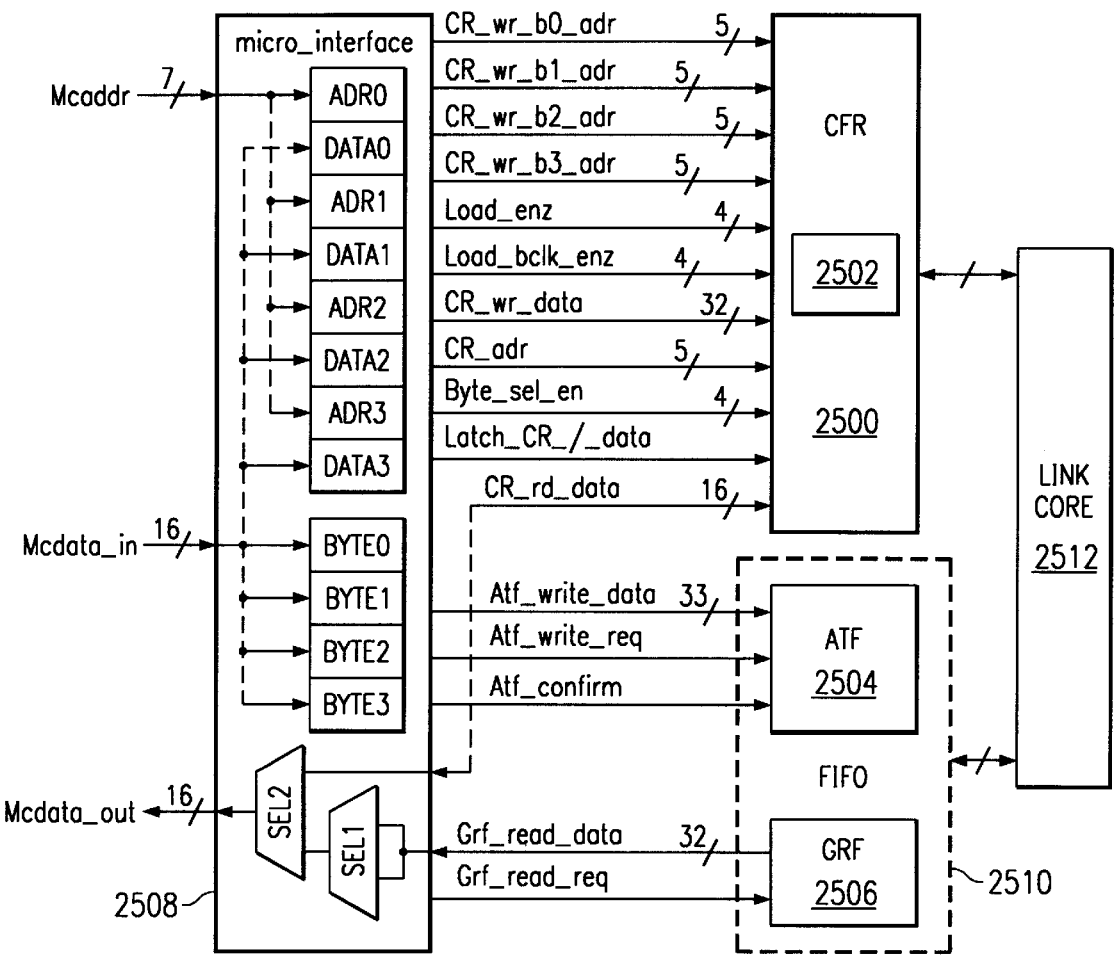
FIG. 25 shows a data flow diagram of the micro-interface to the FIFOs and configuration register.

FIG. 25 shows a data flow diagram of the micro-interface 2508 to the FIFO 2510 and configuration register 2500. The innovative bus transaction accelerator circuitry 2502 is designed into the configuration register 2500. The FIFO 2510 comprise an asynchronous transmit FIFO 2504 and a general receive FIFO 2506. The link core 2512 resides inside of GP2Lynx and handles communication with the PHY-LINK interface.

Computer Embodiment

Figure 27:
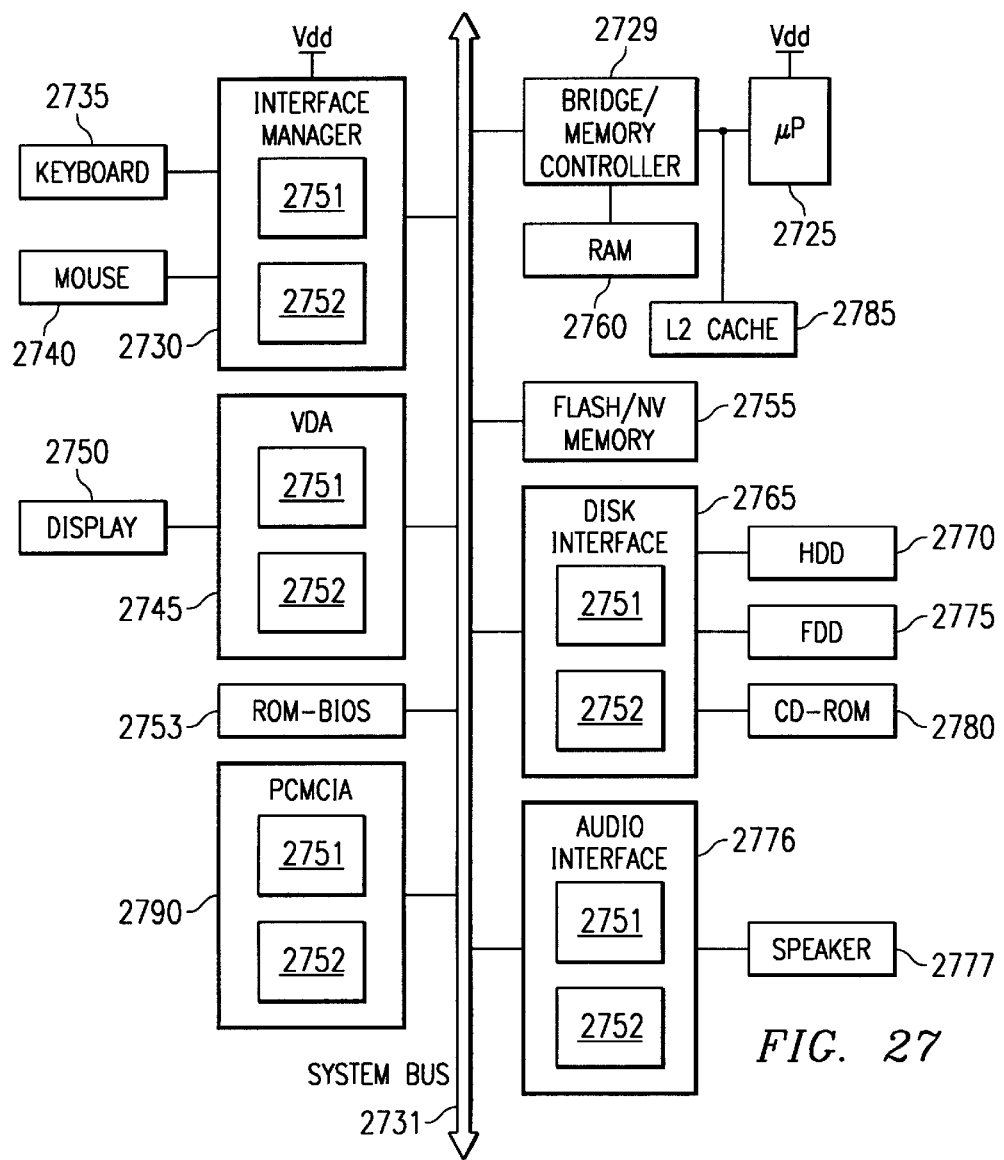
FIG. 27 shows a computer incorporating the innovative status register and control register transaction circuits.

FIG. 27 shows a computer incorporating an embodiment of the innovative bus transaction accelerator (an innovative status register circuit 2752 and an innovative control register circuit 2751) in an audio interface card 2776, a disk drive interface 2765, a PCMCIA interface 2790, a video display adapter 2745, and an interface manager 2730. Naturally, the innovative bus transaction accelerator is not limited to use in the components shown and may be used where required by any component that connects to a bus. The complete computer system includes in this example: user input devices (e.g. keyboard 2735 and mouse 2740); at least one microprocessor 2725 which is operatively connected to receive inputs from the input devices, across perhaps a system bus 2731, through an interface manager chip 2730 which provides an interface to the various ports and registers; the microprocessor interfaces to the system bus through perhaps a bridge controller 2727; a memory (e.g. flash or non-volatile memory 2755, RAM 2760, and BIOS 2753), which is accessible by the microprocessor; a data output device (e.g. display 2750 and video display adapter card 2745) which is connected to output data generated by the microprocessor 2725; and a mass storage disk drive 2770 which is read-write accessible, through an interface unit 2765, by the microprocessor 2725.

Optionally, of course, many other components can be included, and this configuration is not definitive by any means. For example, the portable computer may also include a CD-ROM drive 2780 and floppy disk drive ("FDD") 2775 which may interface to the disk interface controller 2765. Additionally, L2 cache 2785 may be added to speed data access from the disk drives to the microprocessor 2725, and a PCMCIA 2790 slot accommodates peripheral enhancements. The computer may also accommodate an audio system for multimedia capability comprising a sound card 2776 and a speaker(s) 2777. According to a disclosed class of innovative embodiments, there is provided: An interface between subsystems of electronic systems, comprising: first and second subsystems connected by a bus including status and control lines; a control circuit comprising a signal transfer chain and automatic clear circuitry, said signal transfer chain being functionally connected to receive an input from said first subsystem and to provide a corresponding output to said second subsystem, wherein said signal transfer chain of said control register can propagate a signal from said input to said output without any handshake occurring between said first subsystem and said second subsystem; and a status circuit comprising a signal transfer chain and automatic clear circuitry, said signal transfer chain being functionally connected to receive an input from said second subsystem and to provide a corresponding output to said first subsystem, wherein said signal transfer chain of said status circuit can propagate a signal from said input to said output with no foreground handshake occurring between said first subsystem and said second subsystem.

According to another disclosed class of innovative embodiments, there is provided: An interface between subsystems of electronic systems, comprising: first and second subsystems connected by a bus including status and control lines; and a status circuit comprising a signal transfer chain and automatic clear circuitry, said signal transfer chain being functionally connected to receive an input from said second subsystem and to provide a corresponding output to said first subsystem, wherein said signal transfer chain of said status circuit can propagate a signal from said input to said output with no foreground handshake occurring between said first subsystem and said second subsystem.

According to another disclosed class of innovative embodiments, there is provided: An interface between subsystems of electronic systems, comprising: first and second subsystems connected by a bus including status and control lines; and a control circuit comprising a signal transfer chain and automatic clear circuitry, said signal transfer chain being functionally connected to receive an input from said first subsystem and to provide a corresponding output to said second subsystem, wherein said signal transfer chain of said control register can propagate a signal from said input to said output with no fore-ground handshake occurring between said first subsystem and said second subsystem.

According to another disclosed class of innovative embodiments, there is provided: A circuit structure for accelerating bus transaction status register access in multi-clock systems, comprising: a first electronic data storage device, having an input functionally connected to a voltage source, an output, an enable input for accepting a first chip enable signal, a clock input functionally connected to an external system clock, and a clear input; a second electronic data storage device, having an input functionally connected to the output of the first data storage device, an output, and a clock input functionally connected to a host system clock; a first control circuit for clearing the output of the first data storage device, having an output functionally connected to the clear input of the first data storage device, a first input functionally connected to the output of the second data storage device, and a second input; a third electronic data storage device, having an input functionally connected to the output of the second data storage device, an output functionally connected to a host system and to the second input of the first control circuit, an enable input, and a clock input functionally connected to the host system clock; and a second control circuit for enabling said third electronic data storage device, having an output functionally connected to the enable input of the third data storage device, a first input functionally connected to the output of the second data storage device, a second input for accepting a write enable signal from the host system, and a third input for accepting a data-in status bit from the external system.

According to another disclosed class of innovative embodiments, there is provided: A circuit structure for accelerating bus transaction control register access in multi-clock systems, comprising: a first data storage device, having a state input functionally connected to a host data output, a state output, an enable input for accepting a host system write enable signal, a clock input functionally connected to a host system clock, and a clear input; a second data storage device, having a state input functionally connected to the state output of the first data storage device, a state output, an enable input for accepting a write enable signal, and a clock input functionally connected to an external system clock; and a control circuit for enabling the second data storage device, having an output functionally connected to the enable input of the second data storage device and an input functionally connected to the host system write enable signal.

According to another disclosed class of innovative embodiments, there is provided: A circuit structure for accelerating bus transaction status register access in multi-clock systems, comprising: a first electronic data storage device, having an input for accepting status information, an output, and a clock input functionally connected to an external system clock; a second electronic data storage device, having an input functionally connected to the output of the first data storage device, an output, an enable input, and a clock input functionally connected to an external system clock; a third electronic data storage device, having an input functionally connected to the output of the second data storage device, an output functionally connected to a host system, an enable input, and a clock input functionally connected to the host system clock; a control circuit for enabling the second and third data storage devices, having a first output functionally connected to the enable input of the second data storage device, a second output functionally connected to the enable input of the third data storage device, a first input functionally connected to the external system clock, a second input functionally connected to the host system clock, and a third input functionally connected to said second output of said control circuit.

According to another disclosed class of innovative embodiments, there is provided: An integrated circuit device structure, comprising: a first area clocked under a first local oscillator; a second area clocked under a second local oscillator; and a bus transaction accelerator circuit, whereby data is reliably exchanged between the first area and the second area.

According to another disclosed class of innovative embodiments, there is provided: A method of accelerating status register transactions in multi-clock systems, comprising the steps of: (a) providing a first, a second, and a third electronic data storage devices, each having an input and an output; (b) loading an external system interrupt request into the first data storage device; (c) clocking the first data storage device by an external system clock, whereby the interrupt request is made available to the second data storage device; (d) passing the interrupt request to the second data storage device; (e) clocking the second data storage device by a host system clock, whereby the interrupt request is made available to the third data storage device; (f) passing the interrupt request to the third data storage device; (g) clocking the third data storage device by the host system clock, whereby the interrupt request is synchronized with the host system clock and made available to a host system; (h) passing the output of the third data storage device to the host system; (i) clearing the first and second data storage devices; and (j) clearing the third data storage device after the host system has read the system interrupt request.

According to another disclosed class of innovative embodiments, there is provided: A method of accelerating bus transactions in multi-clock systems, comprising the steps of: (a) providing a first, and a second electronic data storage devices, each having a predetermined number of data inputs and data outputs; (b) making a predetermined number of data bits available to the data inputs of the first data storage device; (c) clocking the first data storage device by a host system clock, whereby said predetermined number of data bits is made available to the second data storage device; (d) loading the data bits into the data inputs of the second storage device; (e) clocking the second data storage device by an external system clock, whereby the data bits are made available to an external system; and (f) passing the data bits to the external system.

According to another disclosed class of innovative embodiments, there is provided: A computer, comprising: a user input device; at least one microprocessor which is operatively connected to receive inputs from said input device; a memory which is accessible by the microprocessor; a data output device which is connected to output data generated by the microprocessor; a magnetic disk drive which is operatively connected to the microprocessor; and a bus transaction accelerator circuit operatively connected to the microprocessor.

According to another disclosed class of innovative embodiments, there is provided: A computer, comprising: a user input device; at least one microprocessor which is operatively connected to receive inputs from said input device; a memory which is accessible by the microprocessor; a data output device which is connected to output data generated by the microprocessor; a magnetic disk drive which is operatively connected to the microprocessor; and a circuit card having a local oscillator and a bus transaction accelerator circuit.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

One possible application of this invention is to improve communication speed between a computer and cards that plug into the computer bus (e.g. video cards, multimedia cards, etc.). Cards that have their own on-board oscillator (clock) may benefit from this quick interface to the host system bus.

Figure 26:
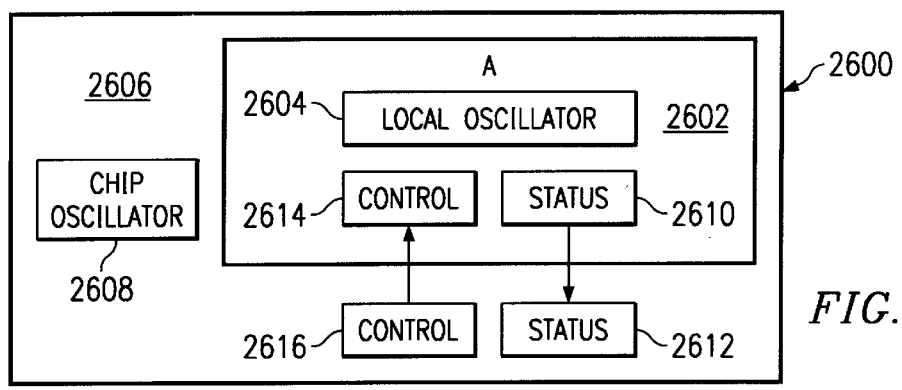
FIG. 26 shows an integrated circuit incorporating the innovative status register and control register transaction circuits.

It should also be noted that, over time, an increasing number of functions tend to be combined into a single chip. The disclosed inventions can still be advantageous even with different allocations of functions among chips, as long as the functional principles of operation described above are still observed. FIG. 26 shows an alternate incorporation of the innovative bus transaction accelerator circuits into an integrated circuit (IC) 2600 which has an area 2602 that runs with a local oscillator (clock) 2604 and an area 2606 that runs with a different local oscillator 2608. Area 2602 may contain status 2610 and control 2614 registers for communications with the rest of chip 2600. Area 2606 may contain status 2612 and control 2616 registers for communications with area 2602. The innovative circuits disclosed could be used to allow area 2602 to exchange data reliably with the rest of the IC 2600. Additionally, it is obvious to one skilled in the art that either area 2602 or 2606 may be clocked by an external oscillator rather than a local oscillator.

What is claimed is:

1. A circuit structure for accelerating bus transaction status register access in multi-clock systems, comprising:
    a first electronic data storage device, having an input functionally connected to a voltage source, an output, an enable input for accepting a first chip enable signal, a clock input functionally connected to an external system clock, and a clear input;
    a second electronic data storage device, having an input functionally connected to the output of the first data storage device, an output, and a clock input functionally connected to a host system clock;
    a first control circuit for clearing the output of the first data storage device, having an output functionally connected to the clear input of the first data storage device, a first input functionally connected to the output of the second data storage device, and a second input;
    a third electronic data storage device, having an input functionally connected to the output of the second data storage device, an output functionally connected to a host system and to the second input of the first control circuit, an enable input, and a clock input functionally connected to the host system clock; and
    a second control circuit for enabling said third electronic data storage device, having an output functionally connected to the enable input of the third data storage device, a first input functionally connected to the output of the second data storage device, a second input for accepting a write enable signal from the host system, and a third input for accepting a data-in status bit from the external system.

2. The circuit structure of claim 1, wherein said first chip enable signal is an external interrupt request.

3. The circuit structure of claim 1, wherein the data storage devices are multivibrators.

4. The circuit structure of claim 1, wherein the data storage devices are flip-flops.

5. A method of accelerating status register transactions in multi-clock systems, comprising the steps of:
    (a.) providing a first, a second, and a third electronic data storage devices, each having an input and an output;
    (b.) loading an external system interrupt request into the first data storage device;
    (c.) clocking the first data storage device by an external system clock, whereby the interrupt request is made available to the second data storage device;
    (d.) passing the interrupt request to the second data storage device;
    (e.) clocking the second data storage device by a host system clock, whereby the interrupt request is made available to the third data storage device;
    (f.) passing the interrupt request to the third data storage device;
    (g.) clocking the third data storage device by the host system clock, whereby the interrupt request is synchronized with the host system clock and made available to a host system;

(h.) passing the output of the third data storage device to the host system;

(i.) clearing the first and second data storage devices; and (j.) clearing the third data storage device after the host system has read the system interrupt request.

6. A method of accelerating bus transactions in multi-clock systems, comprising the steps of:

providing first, and a second electronic data storage devices, each having a predetermined number of data inputs and data outputs;

making a predetermined number of data bits available to the data inputs of the first data storage device;

clocking the first data storage device by a host system clock, said predetermined number of data bits being available to the second storage device;

loading the data bits into the data inputs of the second storage device;

clocking the second data storage device by an external system clock, the data bits being available to an external system; and passing the data bits to the external system;

providing an enabling circuit for the second data storage device;

loading a host system write-enable signal into the enabling circuit;

synchronizing the host system write-enable signal to the external system clock; and passing the synchronized write-enable signal from the enabling circuit to an enable input of the second data storage device.

7. A status register for a first system for communication with a second system operating at a different clock rate than said first system, said first system having a first clock operating at a first clock rate and comprising:

first, second and third serially connected bistable devices, each of said bistable devices having a clock input terminal, an output terminal and a clear terminal;

said clock input of said first bistable device being coupled to said first clock;

said clock inputs of said second and third bistable devices coupled to a second clock from said second system operating at a clock rate different from said first clock rate;

the output of said second and third bistable devices being coupled through an AND gate to the clear terminal of said first bistable device to reset the first bistable device upon receipt of an output from said second bistable device.

8. A status register for a first system for communication with a second system operating at a different clock rate than said first system, said first system having a first clock operating at a first clock rate and comprising:

first, second and third serially connected bistable devices, each of said bistable devices having a clock input terminal, an output terminal and a clear terminal, said first and third bistable devices having an enable input and a second input and said second bistable device having a single input terminal;

said clock input of said first bistable device being coupled to said first clock;

said clock inputs of said second and third bistable devices coupled to a second clock from said second system operating at a clock rate different from said first clock rate;

the output of said second and third bistable devices being coupled through an AND gate to the clear terminal of said first bistable device to reset the first bistable device upon receipt of an output from said third bistable device and said second bistable device.

9. The status register of claim 7 wherein said second input terminal of said second bistable device is coupled to a data communication terminal of said second system.

10. The status register of claim 8 wherein said second input terminal of said third bistable device is coupled to a data communication terminal of said second system.

11. The status register of claim 7 further including input signal circuitry from said second system to said second input terminal of said second and third bistable devices to clear said second and third bistable devices.

12. The status register of claim 8 further including input signal circuitry from said second system to said second input terminal of said third bistable device to clear said third bistable device.

13. The status register of claim 9 further including input signal circuitry from said second system to said second input terminal of said second bistable device to clear said second bistable device.

14. The status register of claim 10 further including input signal circuitry from said second system to said second input terminal of said third bistable device to clear said third bistable device.

15. The status register of claim 7 further including circuitry responsive to a clear signal from said second system to clear said second bistable device and block resetting of said first bistable device.

16. The status register of claim 8 further including circuitry responsive to a clear signal from said second system to clear said second bistable device and block resetting of said first bistable device.

17. The status register of claim 9 further including circuitry responsive to a clear signal from said second system to clear said second bistable device and block resetting of said first bistable device.

18. The status register of claim 10 further including circuitry responsive to a clear signal from said second system to clear said second bistable device and block resetting of said first bistable device.

19. The status register of claim 11 further including circuitry responsive to a clear signal from said second system to clear said second bistable device and block resetting of said first bistable device.

20. The status register of claim 12 further including circuitry responsive to a clear signal from said second system to clear said second bistable device and block resetting of said first bistable device.

21. The status register of claim 13 further including circuitry responsive to a clear signal from said second system to clear said second bistable device and block resetting of said first bistable device.

22. The status register of claim 14 further including circuitry responsive to a clear signal from said second system to clear said second bistable device and block resetting of said first bistable device.

23. A control register for a first system for communication with a second system operating at a different clock rate than said first system, said first system having a first clock operating at a first clock rate and comprising:

first and second serially connected bistable devices, each having an output terminal, first and second input terminals, a clock terminal and a clear terminal, the output terminal of said first bistable device coupled to one of the input terminals of said second bistable device;

third and fourth serially connected bistable devices, each having an output terminal, an input terminal, a clock terminal and a clear terminal;

a first AND gate coupled to said first input terminal of said third bistable device;

a second AND gate coupled to the clear terminal of said third bistable device;

clear circuitry coupled to the clear terminals of said first, second and fourth bistable devices and to said second AND gate;

circuitry coupling one of said input terminals of said first bistable device and the output terminal of said third bistable device to the input of said first AND gate;

said clock terminals of said first and third bistable devices coupled to said first clock and said clock terminals of said second and fourth bistable devices coupled to said second clock the output terminal of said fourth bistable device coupled to the other input terminal of said second bistable device.

24. A control register for a first system for communication with a second system operating at a different clock rate than said first system, said first system having a first clock operating at a first clock rate and comprising:

first and second serially connected bistable devices, each having an output terminal, first and second input terminals, a clock terminal and a clear terminal;

third, fourth and fifth serially connected bistable devices, each having an output terminal, an input terminal, a clock terminal and a clear terminal, the output terminal of said first bistable device coupled to one of the input terminals of said second bistable device;

a first AND gate coupled to said first input terminal of said third bistable device;

a second AND gate coupled to the clear terminal of said third bistable device;

clear circuitry coupled to the clear terminals of said first, second and fourth and fifth bistable devices and to said second AND gate;

circuitry coupling one of said input terminals of said first bistable device and the output terminal of said third bistable device to the input of said first AND gate;

said clock terminals of said first and third bistable devices coupled to said first clock and said clock terminals of said second and fourth and fifth bistable devices coupled to said second clock;

the output terminal of said fourth bistable device also being coupled to said clear terminal of said third bistable device; and the output terminal of said fifth bistable device coupled to the other input terminal of said second bistable device.

25. The control register of claim 23 further including circuitry responsive to a reset signal from said second system to clear said first, second and fourth bistable devices.

26. The control register of claim 24 further including circuitry responsive to a reset signal from said second system to clear said first, second, fourth and fifth bistable devices.

27. The control register of claim 23 wherein one of said second input terminals of said first bistable device is coupled to a data communication terminal of said second system.

28. The control register of claim 24 wherein said second input terminal of said first bistable device is coupled to a data communication terminal of said second system.

29. The control register of claim 25 wherein one of said second input terminals of said first bistable device is coupled to a data communication terminal of said second system.

30. The control register of claim 26 wherein said second input terminal of said first bistable device is coupled to a data communication terminal of said second system.

* * * * *

UNITED STATES PATENT AND TRADEMARK OFFICE
CERTIFICATE OF CORRECTION

PATENT NO.      : 6,584,536 B1
DATED           : June 24, 2003
INVENTOR(S)     : Brian T. Deng It is certified that error appears in the above-identified patent and that said Letters Patent is hereby corrected as shown below:

<u>Title page,</u>
Under Item [22], insert:
-- [60] Related U.S. Application Data
Provisional Application No. 60/103,419, Oct. 7, 1998 --.

<u>Column 1,</u>
Line 3, insert:
-- This application claims priority under 35 USC 119(e)(1) of provisional application number 60/103,419, filed 10/07/98. --

Signed and Sealed this

Fourth Day of November, 2003

JAMES E. ROGAN
*Director of the United States Patent and Trademark Office*